US007333508B2

(12) United States Patent
Rabie et al.

(10) Patent No.: US 7,333,508 B2
(45) Date of Patent: Feb. 19, 2008

(54) METHOD AND SYSTEM FOR ETHERNET AND FRAME RELAY NETWORK INTERWORKING

(75) Inventors: Sameh Rabie, Kanata (CA); Osama Aboul Magd, Kanata (CA); Bashar Abdullah, Ottawa (CA); Baghdad Barka, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 602 days.

(21) Appl. No.: 11/008,709

(22) Filed: Dec. 9, 2004

(65) Prior Publication Data
US 2005/0157751 A1   Jul. 21, 2005

Related U.S. Application Data

(60) Provisional application No. 60/537,744, filed on Jan. 20, 2004.

(51) Int. Cl.
*H04J 3/16* (2006.01)
*H04J 1/10* (2006.01)
*H04L 12/54* (2006.01)
*H04L 12/28* (2006.01)

(52) U.S. Cl. .................. 370/466; 370/395.53; 370/428; 370/401

(58) Field of Classification Search ............... 370/235, 370/246, 389, 392, 395.52, 395.53, 467, 370/492; 455/13.1; 714/713; 725/148, 725/149
See application file for complete search history.

(56) References Cited

U.S. PATENT DOCUMENTS 6,611,522 B1  8/2003  Zheng et al.
2002/0159462 A1  10/2002  Demaria et al.
2002/0176450 A1  11/2002  Kong et al.
2003/0067934 A1*  4/2003  Hooper et al. ............... 370/428
2003/0076838 A1  4/2003  Shalo et al.
2004/0022255 A1  2/2004  Chen et al.

OTHER PUBLICATIONS

Bot, "Key Technical Considerations When Using Ethernet Solutions in Existing ATM and Frame Relay Networks," *JEEE Communications Magazine*, Mar. 2004, pp. 96-102.
Grossman et al, "Multiprotocol Encapsulation over ATM Adaptation Layer 5" (rfc2684), Sep. 1999, entire document. Downloaded from http://www.faqs.org/rfcs/rfc2684.html (Address valid as of Sep. 5, 2006).

* cited by examiner

*Primary Examiner*—Afsar Qureshi
(74) *Attorney, Agent, or Firm*—Christopher & Weisberg, P.A.

(57) ABSTRACT

A method and system for interworking between an Ethernet communication network and a frame relay network, in which a first network interface is operable to communicate with the Ethernet communication network using an Ethernet communication protocol. A second network interface is operable to communicate with the frame relay communication network using a frame relay protocol. A processing unit is in communication with the first network interface and the second network interface, in which the processing unit encapsulates frames received from the Ethernet network into frame relay frames, decapsulates frames received from the frame relay network to recover Ethernet frames and maps parameters corresponding to the received one of the frame relay and Ethernet frames into the other of the frame relay and Ethernet frames, the mapped parameters including connection configuration control plane information and data plane parameters corresponding to individual frames.

36 Claims, 29 Drawing Sheets

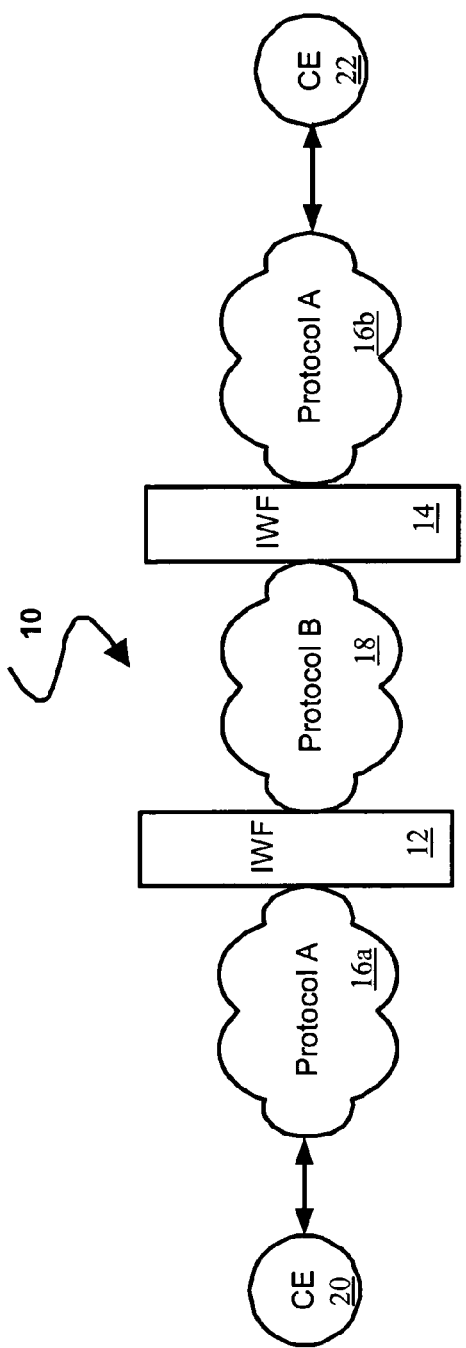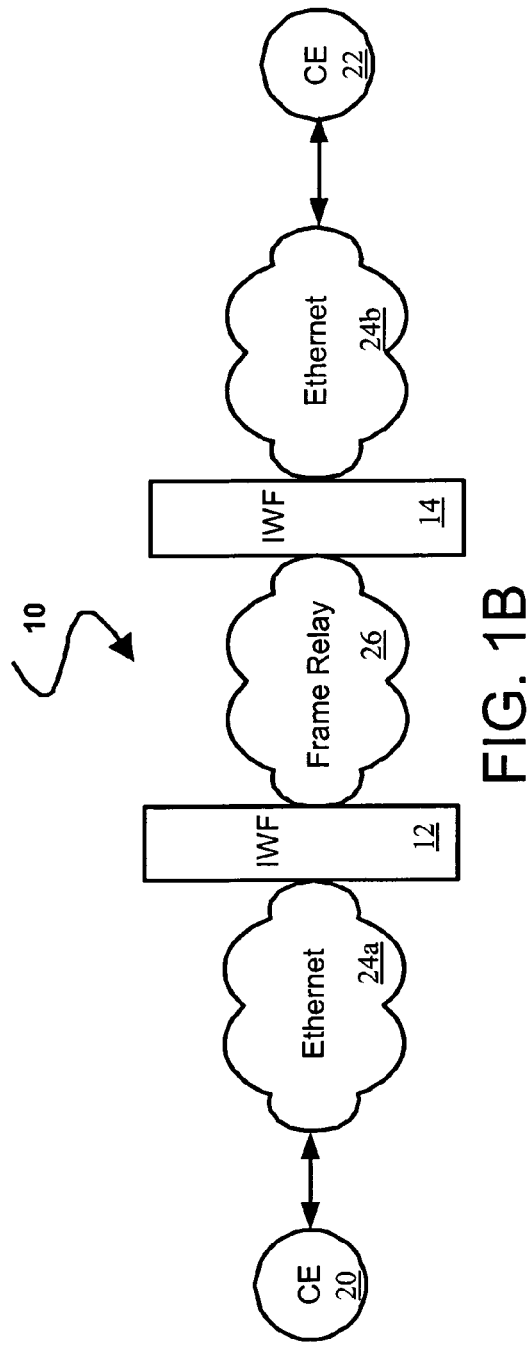

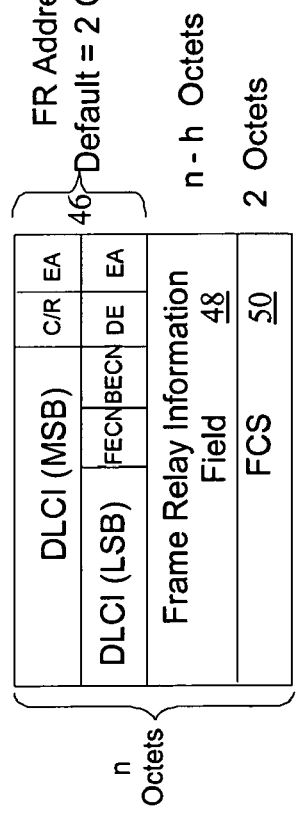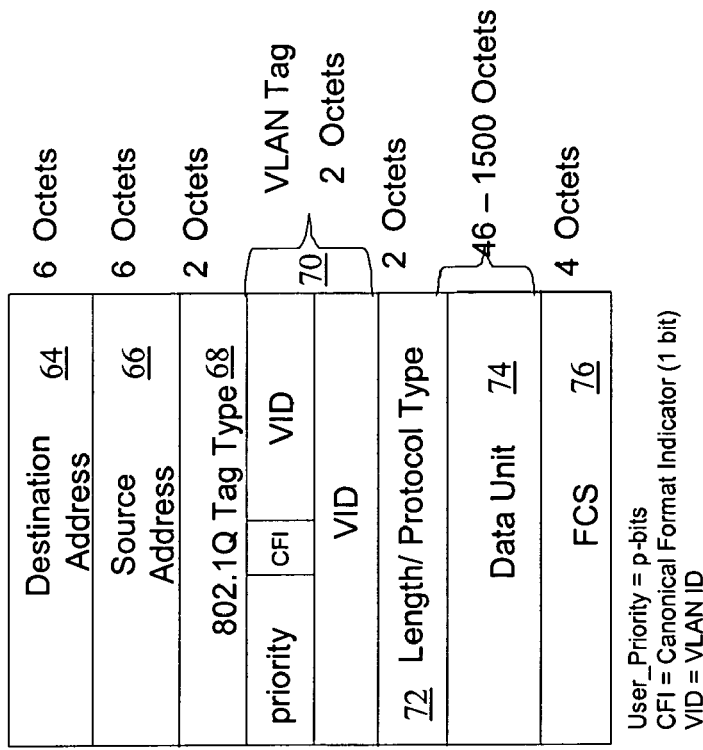
FIG. 2

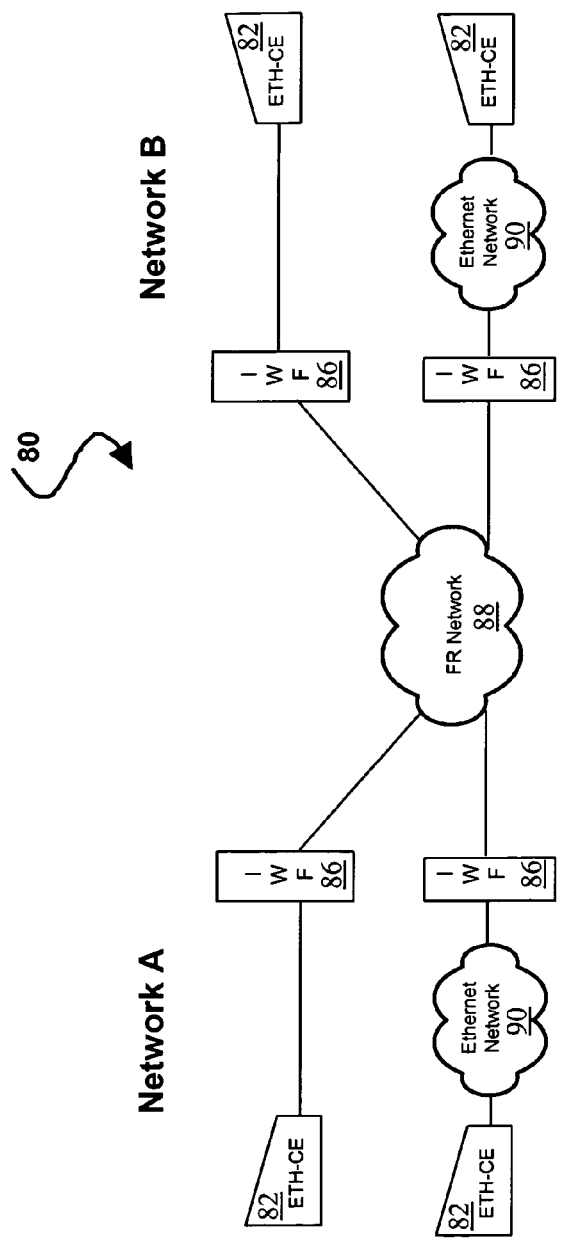
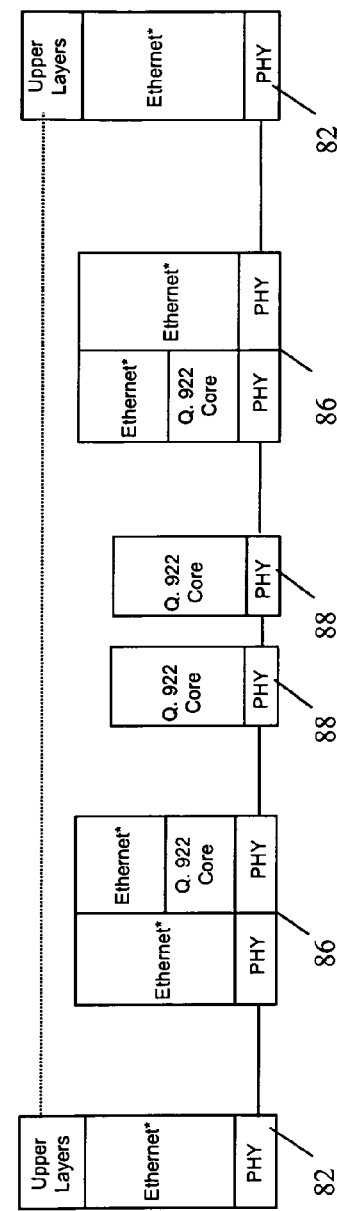
FIG. 5A
FIG. 5B

FIG. 18

| Ethernet → FR direction | 270 |
|---|---|
| Bc = CBS, $CIR_F$=$CIR_E$, $EIR_F$=$EIR_E$ | 272 |
| Bc = CBS, $CIR_F$=$CIR_E$, Be=EBS | 274 |
| Bc = CBS, Be = EBS, Tc=(CBS+EBS)/(CIR+EIR) | 276 |

FIG. 20

| Ethernet → FR direction | 284 |
|---|---|
| When PBS > CBS<br>$CIR_F$ = $CIR_E$, Bc = CBS, and $EIR_F$ = PIR − CIR | 286 |
| When PBS > CBS<br>$CIR_F$ = $CIR_E$, Bc = CBS, and Be = PBS − CBS | 288 |
| PBS < CBS (CE traffic shaping)<br>$CIR_E$ = $CIR_E$, Bc = CBS, and $EIR_F$ = PIR − CIR | 290 |

340 →

| Ethernet p-bits | ETH PHB | ETH Service Class | FR Service Class | FR DLC ID | FR TP/DP | FR DE |
|---|---|---|---|---|---|---|
| 111 | EF | Platinum | Real-time | 1 | TP 15, DP 7 | 0 |
| 110 | AF31 | Gold | Real-time | 1 | " | 0 |
| 101 | AF32 | Gold | Real-time | 1 | " | 1 |
| 100 | AF21 | Silver | Mission-critical data | 2 | TP 10, DP 4 | 0 |
| 011 | AF22 | Silver | Mission-critical data | 2 | " | 1 |
| 010 | AF11 | Bronze | Regular Data | 3 | TP 2, DP 0 | 0 |
| 001 | AF12 | Bronze | Regular Data | 3 | " | 1 |
| 000 | DF | Best Effort | Regular Data | 3 | " | 1 |

METHOD AND SYSTEM FOR ETHERNET AND FRAME RELAY NETWORK INTERWORKING

CROSS-REFERENCE TO RELATED APPLICATIONS

This application is related to and claims priority to U.S. Patent Application No. 60/537,744, filed Jan. 20, 2004, entitled, ETHERNET DIFFERENTIATED SERVICES, the entirety of which is incorporated herein by reference. This application is also related to U.S. patent application Ser. No. 10/990,899, filed Nov. 17, 2004, entitled, METHOD AND SYSTEM FOR FRAME RELAY AND ETHERNET SERVICE INTERWORKING, the entirety of which is incorporated herein by reference.

STATEMENT REGARDING FEDERALLY SPONSORED RESEARCH OR DEVELOPMENT n/a

BACKGROUND OF THE INVENTION

1. Statement of the Technical Field

The present invention relates to the field of networking communications and more particularly to a method and system for allowing efficient communications across disparate networking technologies such as frame relay and ethernet.

2. Description of the Related Art

Network technologies are not homogeneous. End-to-end connections can span multiple networking technologies, for example, Ethernet, asynchronous transfer mode (ATM), frame relay (FR), multi-protocol label switching (MPLS), and Internet protocol (IP). In addition, an Ethernet network may include multiple customer edge devices, switches, and routers. These components may communicate using different protocols, spanning the various layers of the OSI interworking model (e.g., L1-L7). For example, routers communicate using a layer three (L3) protocol while the switches communicate using a layer two (L2) protocol.

While solutions have been proposed to allow the transport of data between end points supported by disparate technologies, such solutions are typically inefficient and inadequate solutions such as encapsulation and data extraction and simple repacketizing. These solutions fail to consider or address the preservation of aspects of the data transport environment such as quality of service, prioritization, etc. For example, class of service bits in an Ethernet frame are ignored and/or dropped when current technologies convert or encapsulate the data for delivery on the frame relay portion of the network.

In addition, while standards such as Request for Comment 2427 for the pure encapsulation of Ethernet frames for transport over frame relay networks exist, these standards and their implementations do not address important aspects of networking such as service and parameters mapping, QoS as well as the ability to capitalize on efficient networking opportunities such as multiplexing several Ethernet connections on a frame relay connection.

It is desirable to have an internetworking solution which allows the transport of frame relay originated data to an ethernet-based destination, and vice-versa, in a manner which preserves, throughout the network, networking features associated with the originating networking technology.

SUMMARY OF THE INVENTION

The invention describes an architecture and methods that enable network interworking between Ethernet and frame relay networks with single or multiple QoS levels, with different levels of performance guarantees. Network interworking enables end users to communicate using different networking protocols, without performing any specific protocol interworking functions. The architecture provides flexibility in the location and functions of the internetworking function device, and describes methods for direct interworking or interworking over other network technologies.

According to one aspect, the present invention provides an interworking device for supporting network interworking between an Ethernet communication network and a frame relay network, in which the interworking device includes a first network interface operable to communicate with the Ethernet communication network using an Ethernet communication protocol. A second network interface is operable to communicate with the frame relay communication network using a frame relay protocol. A processing unit is in communication with the first network interface and the second network interface, in which the processing unit encapsulates frames received from the Ethernet network into frame relay frames, decapsulates frames received from the frame relay network to recover Ethernet frames and maps parameters corresponding to the received one of the frame relay and Ethernet frames into the other of the frame relay and Ethernet frames. The mapped parameters include connection configuration control plane information and data plane parameters corresponding to individual frames.

According to another aspect, the present invention provides a method for interworking between an Ethernet communication network and a frame relay network, in which frames received from the Ethernet network are encapsulated into frame relay frames. Frames received from the frame relay network are decapsulated to recover Ethernet frames. Parameters corresponding to the received one of the frame relay and Ethernet frames are mapped into the other of the frame relay and Ethernet frames. The mapped parameters include connection configuration control plane information and data plane parameters corresponding to individual frames.

According to yet another aspect, the present invention provides a storage medium storing a computer program which when executed by a processing unit performs a method for network interworking between an Ethernet communication network and a frame relay network, in which frames received from the Ethernet network are encapsulated into frame relay frames. Frames received from the frame relay network are decapsulated to recover Ethernet frames. Parameters corresponding to the received one of the frame relay and Ethernet frames are mapped into the other of the frame relay and Ethernet frames. The mapped parameters include connection configuration control plane information and data plane parameters corresponding to individual frames.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1A is a block diagram of an interface between two networks with different protocols;

FIG. 1B is a block diagram of a system having an Ethernet network segment and a frame relay network segment;

FIG. 2 is a block diagram of a frame relay frame and an Ethernet frame;

FIG. 5A is a block diagram of an exemplary network architecture;

FIG. 5B is a block diagram showing the protocols implemented within the network architecture of FIG. 5A;

FIG. 18 is a table of traffic parameter calculations using the parameters of FIG. 17;

FIG. 20 is a table of traffic parameter calculations using the parameters of FIG. 19;

FIG. 26 is a table showing an example of mapping between Ethernet p-bits and frame relay connections;

DETAILED DESCRIPTION OF THE PREFERRED EMBODIMENTS

Architecture

Figure 3:
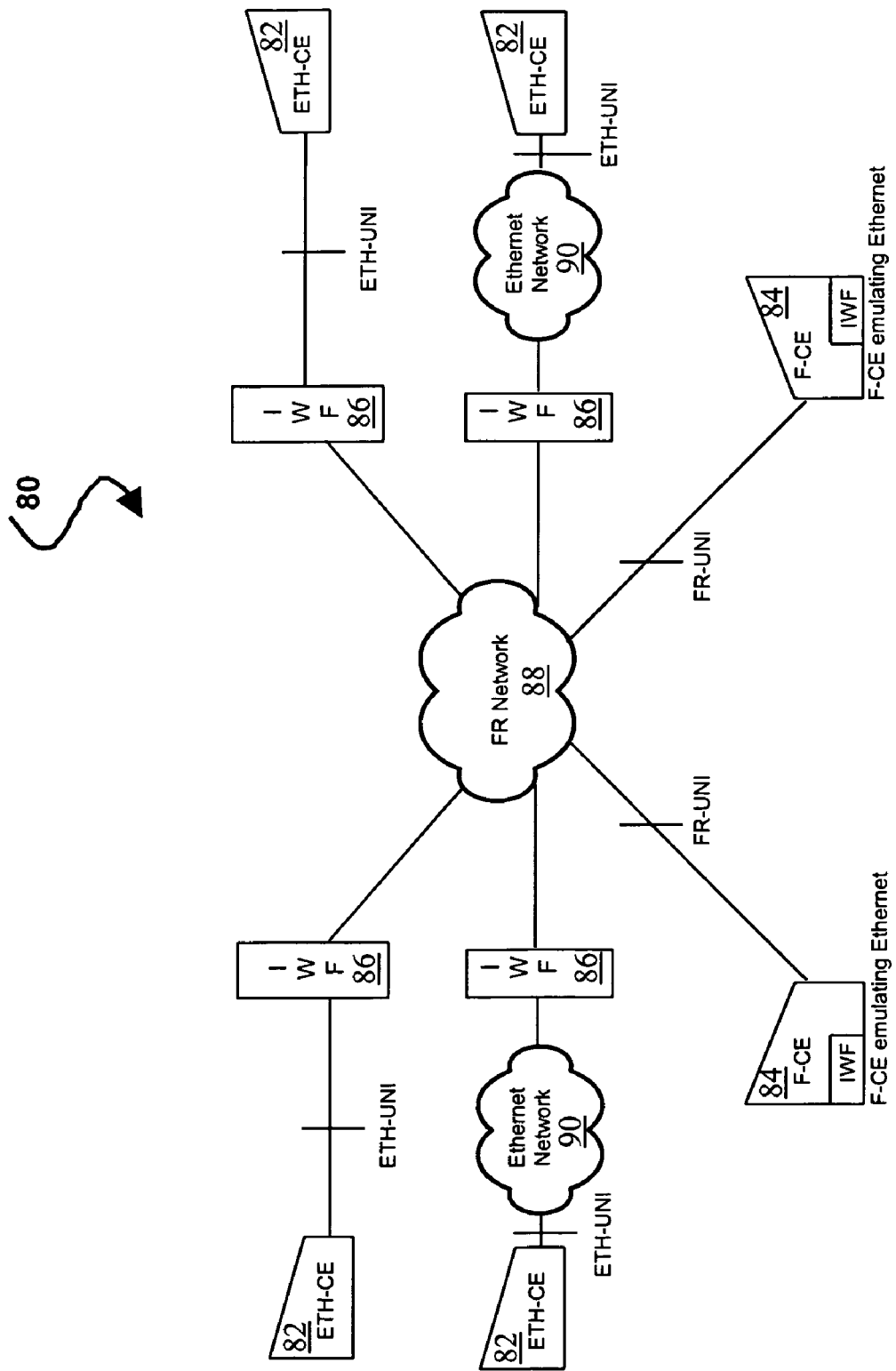
FIG. 3 is a block diagram of a network architecture constructed in accordance with the principles of the present invention.

Referring now to the drawing figures in which like reference designators refer to like elements, there is shown in FIG. 1A, a system constructed in accordance with the principles of the present invention and designated generally as "10". System 10 includes three network segments connected by interworking function (IWF) devices 12 and 14. Two segments, networks 16a and 16b are coupled to IWF devices 12 and 14, respectively, and operate using the same network protocol A. The third segment, network 18, operates using different type of network protocol from that used by networks 16a and 16b. As is shown in FIG. 1A, a communication path is formed by network 16a, IWF 12, network 18, IWF 14 and network 16b. The protocols can include, for example, Ethernet, asynchronous transfer mode (ATM), frame relay (FR), multi-protocol label switching (MPLS), and Internet protocol (IP). Customer edge (CE) devices 20 and 22, for example, routers, switches, etc. are coupled to network segments 16a and 16b, respectively, and serve to interface customer networks (not shown) to system 10. Router, switches, etc. for interconnecting a customer device or network to another network such as a service provider network are known in the art. In the most general sense, the IWF devices 12 and 14 provide interworking functionality and establish relevant parameters within protocol B (network segment 18) based on parameters within protocol A (network segments 16a and 16b).

As used herein, the term "network interworking" refers to the inter-working between networks using similar protocols, e.g., networks 16a and 16b, across an intermediary/core network, e.g., network 18. In network interworking, all or part of the protocol control information used in the two similar networks are transparently transferred by an interworking function across the intermediary/core network. As part of this function, the IWF encapsulates the information which is transparently transferred through the other disparate network. The interworking tasks are performed at IWFs 12 and 14 in a manner that is transparent to customer edge devices/end users. In general, as is described in detail below, IWFs 12 and 14 perform protocol encapsulation and mapping as well new header generation. Advantageously, this arrangement provides Layer 2 (L2) connectivity in a manner that allows the transport of multiple upper layer protocols such as Internetwork Packet Exchange (IPX), Standard Network Architecture (SNA), and the point-to-point (PPP) protocol, thereby minimizing/obviating the need for Layer 3 (L3) routing such as internet protocol (IP) routing. Further, the present invention maps service and parameters, maintains QoS aspects and provides a way to multiplex multiple Ethernet connections on a frame relay connection.

Referring to FIG. 1B, a particular example of a system 10 including three network segments, 24a, 24b and 26, connected by two IWF devices 12 and 14 is shown. IWF device 12 is disposed between the edges of an Ethernet network 24a and a frame relay network 26. IWF device 14 is disposed between the edges of an Ethernet network 24b and the frame relay network 26. Networks 24a and 24b includes connections to customer edge devices such as devices 20 and 22. IWF devices 24a and 24b can be stand alone computing devices arranged to implement the functionality described herein or can be integrated as part of other networking components such as routers and switches as are known in the art. If implemented as a stand alone computing device, IWF devices 12 and 14 include a processing unit, memory, input and output interfaces as well as network communication interfaces as may be implemented by one of skill in the art to implement the functions described herein.

Referring to FIG. 2, the format of a frame relay frame 40 and the format of an Ethernet frame 42 such as may be transported on ethernet network 24a and 24b, and frame relay network 26 are shown. The frame relay frame 40 includes 'n' octets. Of the 'n' octets, one octet is dedicated to a flag 44 at the beginning of the frame, two octets are dedicated to the FCS field 50, and one octet is dedicated to a flag 52 at the end of the frame. The address information 46 of a frame relay frame has a default length of two octets, however this length can be extended to three or four octets. Of the 'n' octets 'n-h' octets are dedicated to the frame relay information field 48 where 'h' is typically between six and eight octets depending on the length of the other fields.

As is readily seen in FIG. 2, the format of a tagged Ethernet frame 42 differs from that of the frame relay frame 40. The tagged Ethernet frame 42 includes a six octet destination address 64, a six octet source address 66, a two octet 802.1 tag 68, a two octet VLAN tag 70, a two octet Length/Protocol Type field 72, and a four octet FCS field 76 (the seven octet preamble and the one octet SFD field are not shown because they are not included in the standard Ethernet traffic parameters). In addition to the addressing and service information, a 46-1500 octet data unit 72 is included in the tagged Ethernet frame 42. Of note, the VLAN tag 70 includes a user priority, also known as "p-bits".

When a packet or frame is forwarded between networks 24a and 26, the IWF device 12 encapsulates the protocol used in one network, and translates and/or maps its protocol control information to that of the protocol used in the other network. Such functions include mapping services between Ethernet and frame relay networks, mapping parameters between these networks, calculating overhead between Ethernet and frame relay frames as well as managing flow control using combinations of frame relay congestion indication, Ethernet p-bits and/or the Ethernet "Pause" frame, all of which are described below in detail. Mapping of protocol information is supported between Institute of Electrical and Electronics Engineers (IEEE) 802.3 or Ethernet V2 frames, with or without Q-Tag (VLAN awareness) specified in 802.1Q, and the frame relay (FR) header. This is done for the data plane and control plane, both of which are described below in detail. In general, the control plane includes configured or signaled information that determines the overall behavior, mappings, resource allocation and forwarding parameters that can be applied to all connection frames or frames of a service class. Such information is typically established and used to set up the network devices before any payload traffic is transmitted. Data plane refers to the frame processing functions that typically take place in real-time on a frame-by-frame basis.

An architecture suitable for encapsulation and/or translation constructed in accordance with the principles of the present invention is described with reference to FIG. 3. Referring to FIG. 3, a network architecture 80 is shown in which the IWF can be located at any of a plurality of locations within the network. The architecture 80 includes Ethernet customer edge devices 82 and frame relay customer edge devices 84. Frame relay customer edge devices 84 are arranged as is known in the art to emulate Ethernet. IWF devices 86 serve as the interface to connect Ethernet customer edge devices to frame relay network 88 directly, or via an Ethernet network 90.

Figure 4A:
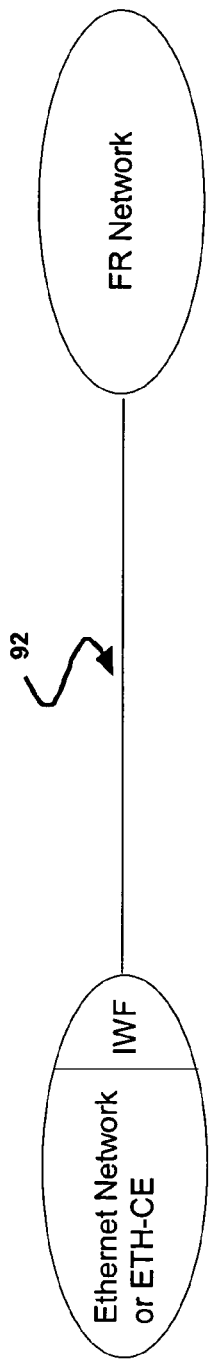
FIGS. 4A-4C are diagrams showing exemplary locations for the placement of an interworking function of the present invention.
Figure 4B:
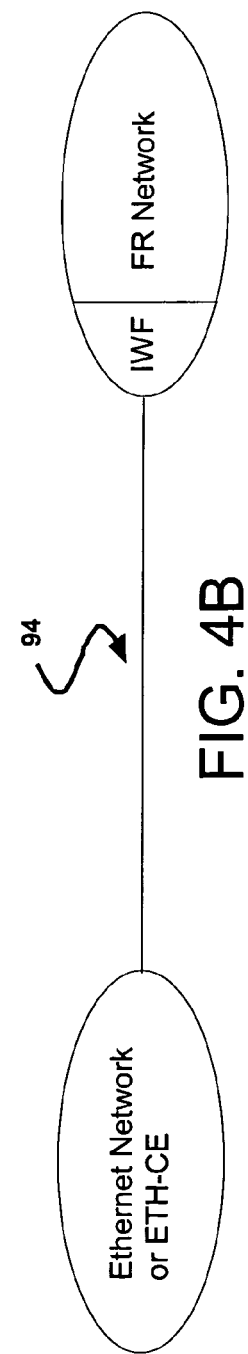
Figure 4C:
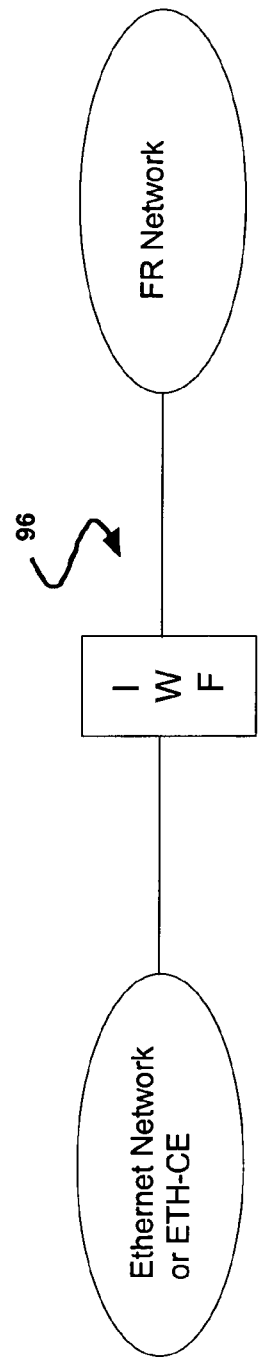

In addition, it is contemplated that the IWF can physically reside in the frame relay customer edge device 84. Referring to FIGS. 3 and 4A-C, it can readily been seen that the IWF can be provided as a set of functions within the Ethernet or frame relay networks, or can be a device that physically couples the Ethernet network to the frame relay network. FIGS. 4A-4C show equivalent implementations of the IWF. FIG. 4A. shows an arrangement 92 in which the IWF is included as part of the Ethernet network. FIG. 4B. shows another arrangement 94 in which the IWF is included as part of the frame relay network. FIG. 4C shows still another arrangement in which the IWF is a separate entity from both the Ethernet and the frame relay networks. These arrangements provide significant interworking flexibility. The chosen configuration in any particular network will depend on several factors such as equipment cost and capabilities (both on the network and customer sides), current network deployment, and network evolution strategy.

FIGS. 5A and 5B are referenced to provide a protocol-based perspective of an exemplary implementation of the present invention. FIG. 5A shows a subset of the diagram provided in FIG. 3. FIG. 5B shows a protocol-based view of the architecture of FIG. 5A taken from a customer edge device 82 in Network A to a customer edge device 82 in network B via IWFs 86 and frame relay network 88. As is shown in FIG. 5B, the devices are interconnected to provide a physical path from Ethernet CE device 82 in Network A to another Ethernet CE device 82 in Network B. The frame relay-based elements (network 88 and a portion of IWFs 86) also include a core arranged to support the native frame relay protocol, e.g. a Q.922 core. In accordance with the architecture shown in FIGS. 5A and 5B, the end user does not see or have any interaction with the use of frame relay. The IWFs 86 provide all mapping and encapsulation functions to ensure that the service provided to the Ethernet customer edge devices 82 are unchanged by the presence of a frame relay transport.

Figure 6A:
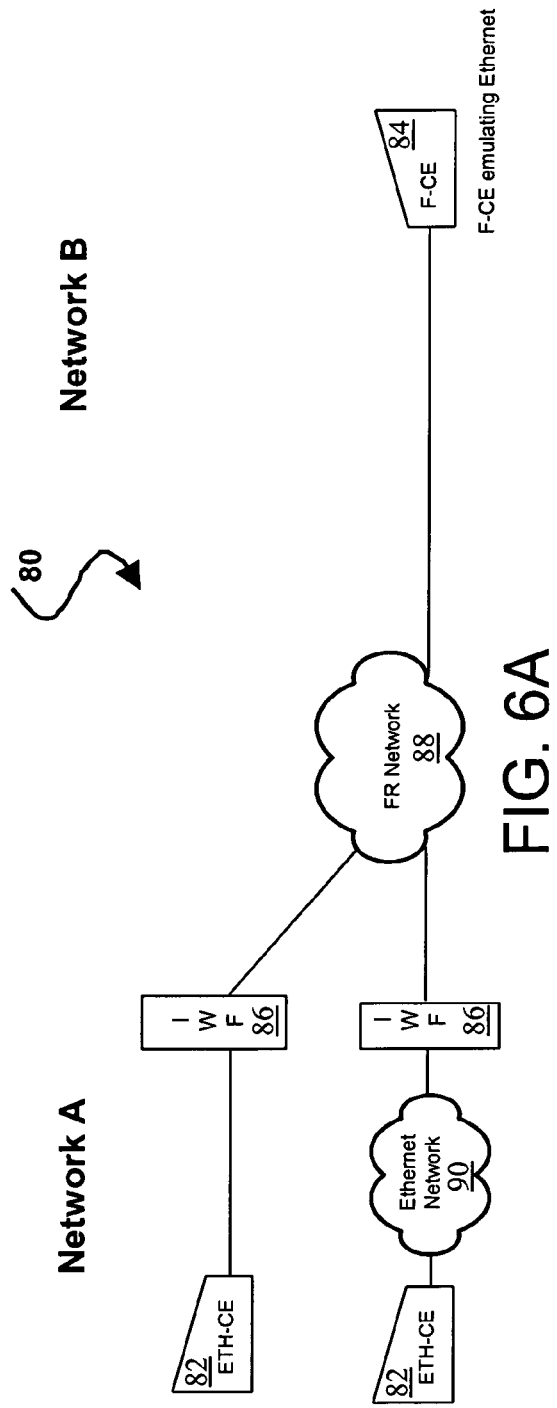
FIG. 6A is a block diagram of another exemplary network architecture.
Figure 6B:
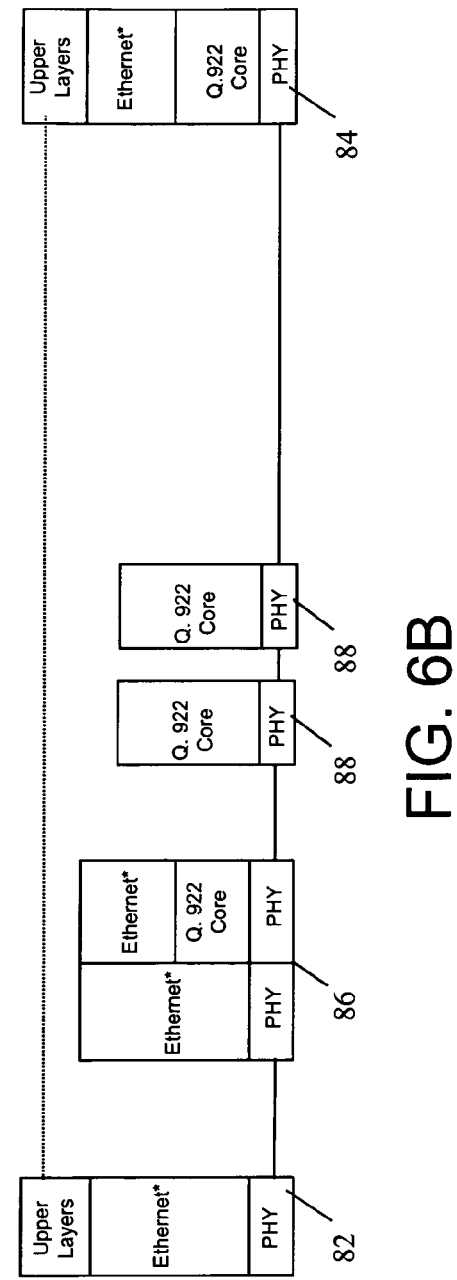
FIG. 6B is a block diagram showing the protocols implemented within the network architecture of FIG. 6A.

FIGS. 6A and 6B are referenced to provide a protocol-based perspective of an another exemplary implementation of the present invention. FIG. 6A shows another subset of the diagram provided in FIG. 3. FIG. 6B shows a protocol-based view of the architecture of FIG. 6A taken from a customer edge device 82 in Network A to a frame relay customer edge device 84 in network B via a single IWF 86 and frame relay network 88. As is shown in FIG. 6B, the devices are interconnected to provide a physical path from Ethernet CE device 82 in Network A to an Ethernet emulating frame relay CE device 84 in Network B. The frame relay-based elements (network 88, a portion of IWF 86 and a frame relay customer edge device 84) also include a core arranged to support the native frame relay protocol, e.g. a Q.922 core. In accordance with the architecture shown in FIGS. 6A and 6B, the end user does not see or have any interaction with the use of frame relay. Frame relay CE device 84 supports the Ethernet to frame relay IWF in its protocol stack. The IWF 86 and the IWF within the emulating frame relay CE device 84 provide all mapping needed to ensure that the service provided to the Ethernet CE device 82 is unchanged by the presence of a frame relay transport.

Of note, the asterisk next to the term "Ethernet" in IWF 86 and Ethernet CE devices 82 in FIGS. 5B and 6B refers to the ability of the present invention to support both virtual local area network (VLAN) aware and VLAN unaware Ethernet options. VLANs and the concepts employed by virtual networking are known in the art. In general, VLAN aware Ethernet includes packets arranged according to the base Ethernet standard, e.g. Institute of Electrical and Electronics Engineers (IEEE) standards 802.3/V2 as well as a "Q-tag" under IEEE 802.1Q. Accordingly, the present invention is applicable to implementations of VLAN unaware (use only of base Ethernet 802.3/V2) Ethernet networks as well as VLAN aware Ethernet networks.

Figure 7:
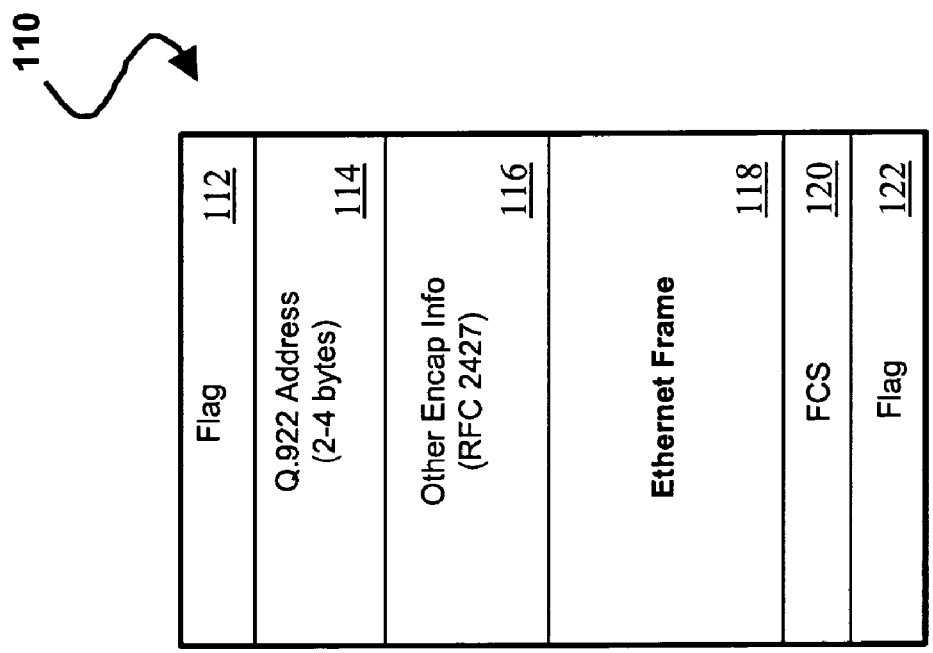
FIG. 7 is a diagram of an Ethernet over frame relay encapsulation format.

Referring to FIG. 7, an Ethernet over frame relay encapsulation format is shown. The IWF performs RFC 2427 bridged mode encapsulation of Ethernet over FR, and mapping between the Ethernet frame and frame relay fields (p-bits, DE, FECN/BECN). The encapsulated frame 110 includes a flag 112, a Q.922 address 114, other Encapsulation information 116, the Ethernet frame 118, FCS 120, and a final flag 122 in the last octet. Techniques for encapsulation in accordance with RFC 2427 are known by those of skill in the art.

Figure 8:
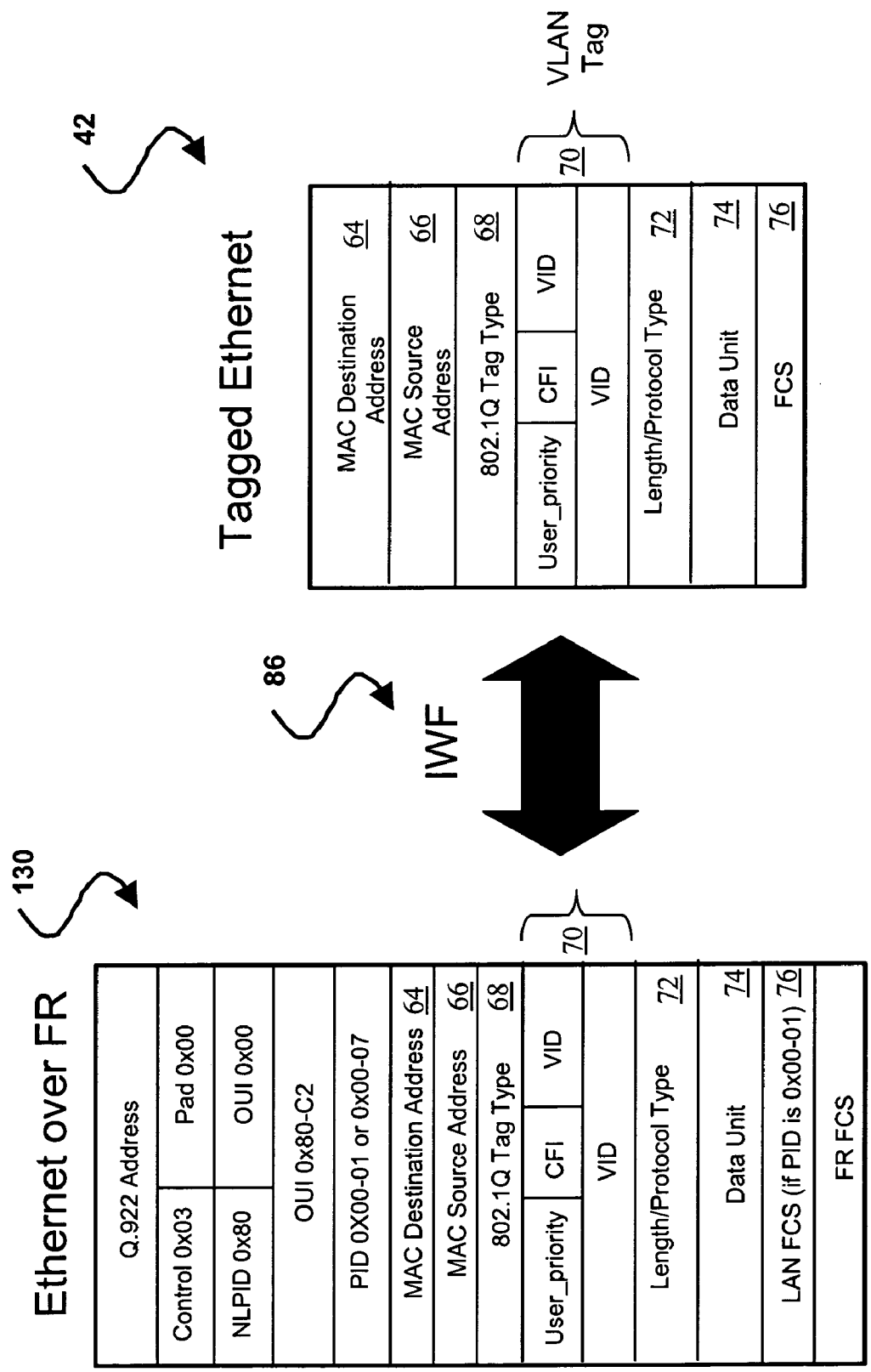
FIG. 8 is an example of an Ethernet frame encapsulated in a frame relay frame.

Encapsulation of the Ethernet frame over frame relay is explained with reference to FIG. 8 Referring to FIG. 8, an example of an encapsulated Ethernet frame is shown (the opening and closing Flags are not shown, as they are excluded from standard FR traffic parameters). As is readily shown, most of the fields in tagged Ethernet frame 42 are encapsulated within frame relay frame 130. For example, MAC source and destination addresses 64 and 66 are carried transparently in frame 130. If applicable, the 802.1Q tag is also carried transparently. Of note, the device performing the IWF may perform Ethernet value-added functions such as interworking between tagged and untagged interfaces and VLAN to p-bits translation. The remaining unlabelled fields in frame 130 are typical components of an RFC 2427 bridged mode encapsulated frame relay frame (see FIG. 2).

Figure 9:
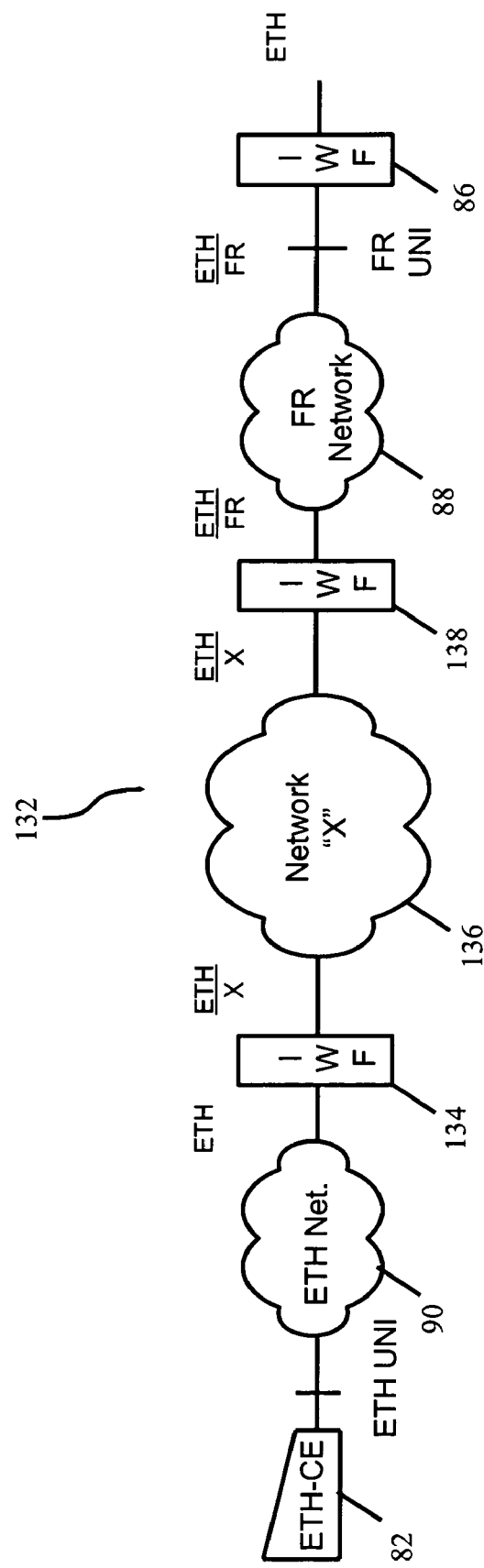
FIG. 9 is a block diagram showing the use of a third networking technology within the architechure of the present invention.

Referring to FIG. 9, it is contemplated that the present invention can support network interworking via a third technology, shown as network 'X' 136 in architecture 132. For example, Ethernet to frame relay network interworking can be achieved through a technology such as ATM, where network X is an ATM network. In this architecture, the IWF device 134 performs network interworking between the ATM network 138 and the Ethernet network 90. A second IWF device 138 performs service interworking between the ATM network 136 and the frame relay network 88 as described in the MPLS/FR Alliance standard, FRF.8. A third IWF device, IWF device 86, performs network interworking between the frame relay network 88 and an Ethernet network (not shown). This allows end to end transport of data between the Ethernet customer edge device 82 and another Ethernet customer edge device (not shown). While in the example above, the interworking via a third technology includes an ATM core, other core networks can be used. For example, the interworking could be achieved over an MPLS core. In the case where network 'X' 136 is an MPLS backbone network, IWF device 134 would perform frame relay to MPLS network interworking and IWF device 138 would perform MPLS to frame relay service interworking.

It is also contemplated that IWF 138 can be implemented by two network interworking functions in tandem, performing Ethernet to MPLS network interworking followed by Ethernet to frame relay network interworking.

Figure 10:
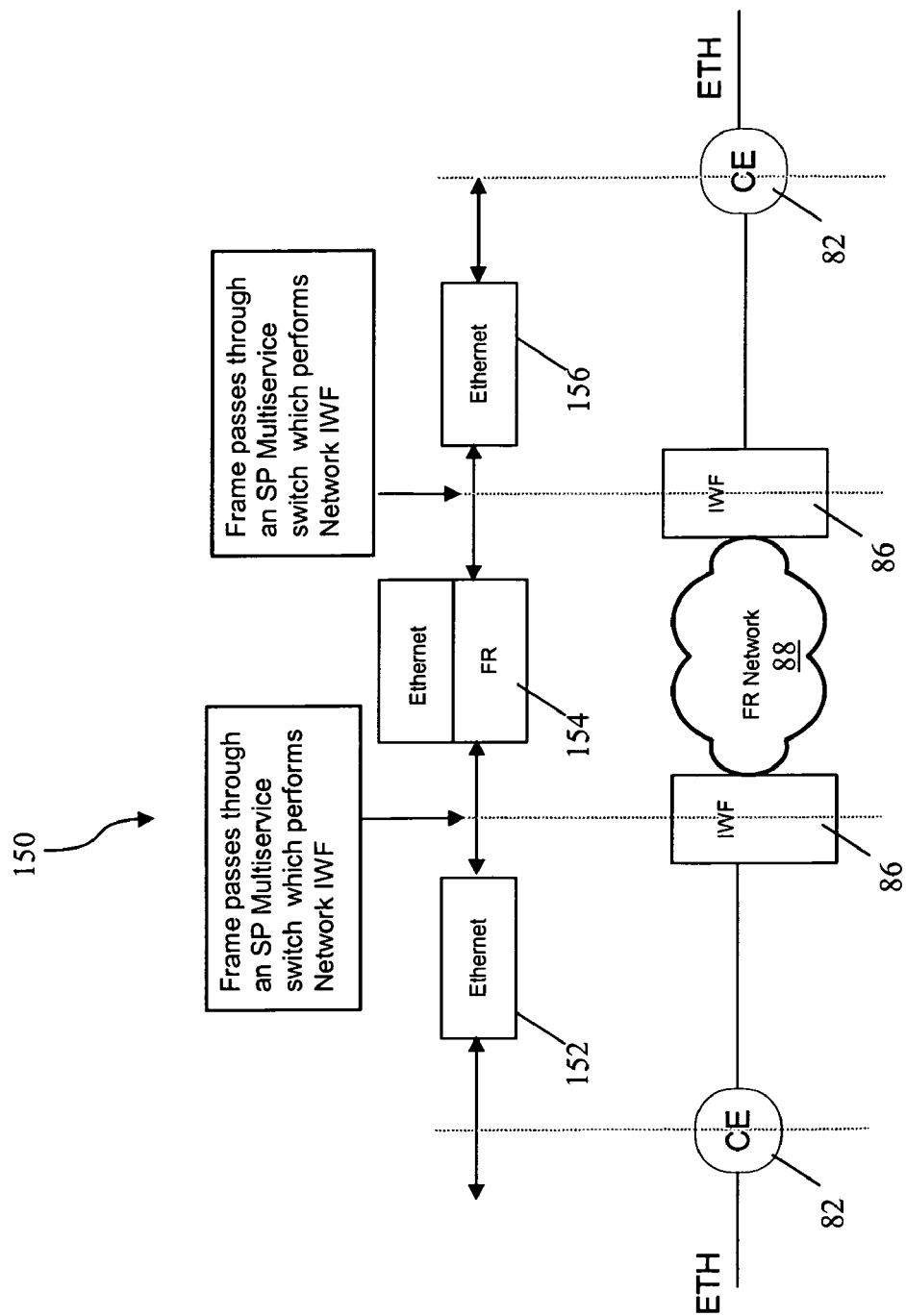
FIG. 10 is a block diagram of an exemplary network architecture showing exemplary steps for network interworking within this architecture.

Exemplary network interworking scenarios are described with reference to FIGS. 10 and 11. Referring to FIG. 10, an example architecture 150 that provides router connectivity through L2 Ethernet using a frame relay provider network 88 is shown. In this example, there is one provider with one network. The architecture 150 includes two Ethernet networks with CE devices 82 connected by a frame relay network 88. Viewing from left to right on FIG. 10, an Ethernet frame 152 passes through an SP multiservice edge switch 86 which performs an Ethernet to frame relay IWF to create an RFC2427 bridged mode compliant encapsulated frame 154. Encapsulate frame 154 passes through frame relay network 88 and passes through another SP multiservice edge switch 86 which performs an Ethernet to frame relay IWF to decapsulate and create Ethernet frame 156. Packets traveling in the opposite direction are treated in the same fashion.

Another scenario is described with reference to FIG. 11. Architecture 160 that provides router connectivity through L2 Ethernet using a frame relay provider network 88 and an Ethernet network 90 is shown. In this example, there is one provider with two networks. The architecture 150 includes an Ethernet customer network with an Ethernet CE device 82 connected to a service provider Ethernet network 90. On the other end, a frame relay customer edge device 84 with Ethernet emulation is coupled to a service provider frame relay network 88. Frame relay network 88 and Ethernet network 90 are coupled to IWF 86.

Figure 11:
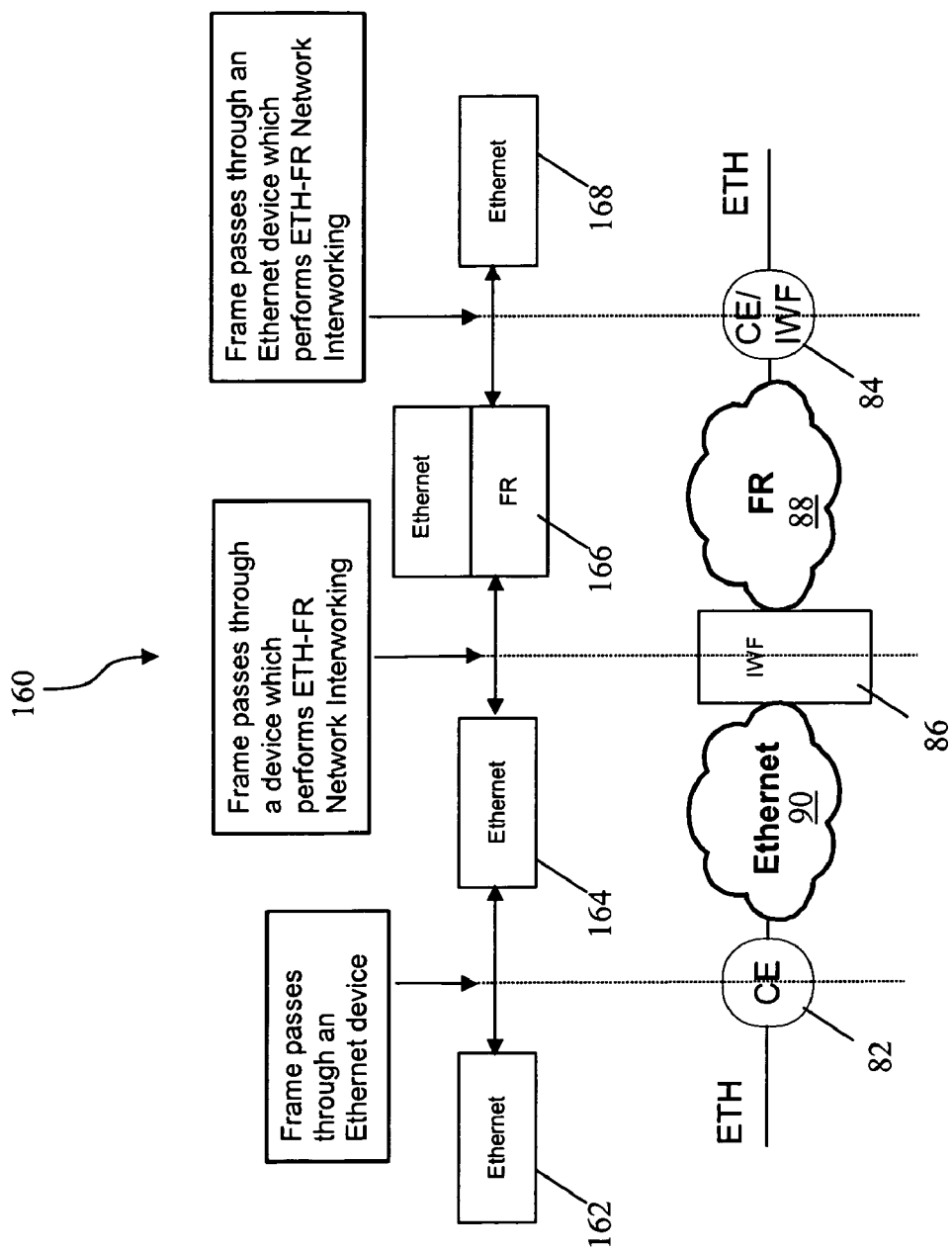
FIG. 11 is a block diagram of another exemplary network architecture showing exemplary steps for network interworking within this architecture.

Viewing from left to right on FIG. 11, an Ethernet frame 162 passes through an Ethernet CE device 82 onto service provider Ethernet network 90. The Ethernet frame, now Ethernet frame 164 passes through IWF86 which performs Ethernet to frame relay networking IWF to create an RFC2427 bridged mode compliant encapsulated frame 166. Encapsulated frame 166 passes through frame relay network 88 and passes through the frame relay customer edge device 84 with Ethernet emulation which performs an Ethernet to frame relay IWF to decapsulate and create Ethernet frame 168. Packets traveling in the opposite direction are treated in the same fashion with device 84 creating the RFC2427 compliant encapsulated frame 166.

As another scenario, it is contemplated that this methodology can be readily extended to the architecture shown and described above with respect to FIG. 9. The IWF can be implemented as a separate unit, as part of a CE device or as part of a provider edge (PE) device such as a provider-owned router or switch. It is also contemplated that the IWF can be implemented at the network to network interface (NNI) between provider networks. For example, in the case where the provider network is based on Metro Ethernet Forum (MEF) standards as are known in the art, the present invention can be implemented by extending these standards to allow the deployment of the IWF in the PE device, such as a PE device that interfaces a frame relay CE to the service provider Ethernet network. In the case where the provider network is a Frame Relay Network, the PE device including the IWF is one that interfaces an Ethernet CE device to the provider frame relay network.

In both cases, the frame relay data link connections are mapped to corresponding Ethernet Virtual Connections (EVCs), described below in detail.

While FIGS. 1-7 describe embodiments of architectures for frame relay to Ethernet interworking, other network configurations and interworking scenarios are possible. In each configuration, the interworking may include the mapping of service, traffic parameters, and quality of service (QoS) indications. With the architecture of the present invention described above with respect to FIGS. 1-11, the remainder of this document is arranged as follows. Ethernet services supported by the present invention are described next. Following Ethernet services is a description of frame relay services supported by the present invention. Interworking functions for a single class of service arranged in accordance with the present invention follows. Interworking functions for multiple classes of service arranged in accordance with the present invention are described. Finally, arrangements and methods for multiplexing connections are described.

Ethernet Services

Ethernet services supported by the present invention can include well-defined classes with different levels of service, such as Gold, Silver, Bronze, having different frame loss, delay, and jitter guarantees. As used herein, an EVC is a collection of Ethernet frames that are classified and grouped together for the purpose of interworking with frame relay. EVC frames may include all Ethernet frames arriving at an Ethernet port (or on multiple Ethernet ports as described in the multiplexing section later), or the frame belonging to one or more VLANs if the frames arrive on a VLAN aware interface. EVCs are bidirectional point-to-point connections which allow asymmetrical bandwidth profiles in the different directions. An EVC can support single or multiple service classes. This arrangement advantageously allows bandwidth to be optionally defined on a per class of service (CoS) basis. An EVC can be based on the Ethernet port, the Ethernet port and one or more VIDs, one or more MAC source and destination address pairs, or the MAC source, destination address and one or more VIDs.

An EVC can be associated with one or more bandwidth profiles and with one or more forwarding treatment rules for its frames. From a quality of service (QoS) perspective, a single QoS EVC provides a single bandwidth profile and a single forwarding treatment for all frames within the EVC. A multiple CoS EVC provides a single bandwidth profile and multiple forwarding treatments for all frames within the EVC. A multiple QoS EVC provides multiple bandwidth profiles and multiple forwarding treatments for all frames within the EVC. The bandwidth profile is used for resource reservation and allocation, admission control and traffic policing and is a control plane function, described below in detail. The forwarding treatment indicates scheduling and discard treatment of the frame. Forwarding treatment is specified by the per hop behavior (PHB) assignments to the frame and is based on EVC type, and of OSI protocol Layer 1-7 fields. Forwarding treatment is a data plane function, described below in more detail. PHB is an indication of the forwarding treatment applied to a frame and indicates a frame per-hop scheduling class (PSC) and drop precedence (DP), where higher DP frames are discarded before lowed DP frames in a congestion condition. Also, as used herein, DP may also indicate a frame relay connection discard priority. Bandwidth profile and forwarding treatments are independent from one another in accordance with the present invention. Frames with different service classes can be combined with the same bandwidth profile or assigned to separate bandwidth profiles.

The IEEE 802.1Q Tag in a tagged Ethernet service frame (see FIG. 2) includes p-bits in the frame header. These p-bits can be used to identify nodal behavior and determine the forwarding treatment received by the Ethernet frame. Such nodal behavior includes expedited forwarding, assured forwarding, and default forwarding. The present invention provides a number of options for supporting and identifying the Ethernet frame service class behavior, e.g. scheduling, drop precedence and expected performance.

As one option, Ethernet frame service class and drop precedence can be identified using Ethernet L2 indicators only. The most common fields are the p-bits, but other L2 indicators such as the CFI bit, source and destination MAC addresses and VLAN ID can be used. This option is suitable for pure Ethernet L2 networks, and has the advantage of being simple and independent from the ULP carried by the Ethernet frame.

As another option, the more general multi-field classification that spans any of the Layer 1 to Layer 7 protocol layers can be used, either individually or in combination. For example, if the frame is carrying IP traffic, this option can use the IP protocol information such as the protocol type, IP source and destination addresses, differentiated services code point and/or TCP/UDP port numbers.

As used herein, Ethernet per-hop-behavior (PHB) data is defined as the per-hop scheduling class (PSC) data plus the drop precedence data. Additional information regarding Ethernet PHBs can be found in the inventors' pending U.S. patent application Ser. No. 10/868,536, entitled ETHERNET DIFFERENTIATED SERVICES, the entirety of which is incorporated herein by reference. The basic principle is that each incoming Ethernet frame is assigned a PHB which specifies forwarding treatment of the frame by edge and core network nodes. Generally, PSC is synonymous with a service class or service, but it is contemplated that multiple PSCs can be combined into a single service class. If single service is supported, all frames are treated and mapped equally by the IWF, irrespective of the interface being VLAN-aware or VLAN-unaware and the presence/absence or encoding of the p-bits.

Alternatively, a single service per port/VID could be supported based on the VID or p-bits value on VLAN-aware interfaces (data plane function, controlled by the Control Plane rules). If multiple services are supported by the Ethernet connection, multiple traffic contracts/parameters may be specified independently for each service (traffic contracts can be used for traffic policing, resource reservation/admission control, and SLAs). In effect, each service can be treated independently like a separate sub-connection (control plane function).

Frame Relay Services

ITU X.36 defines frame relay virtual connection (FVC) transfer and discard priorities. For frame relay, 16 transfer priority (TP) levels are defined. TP is defined per virtual connection (VC) and for each direction. During data transfer a virtual connection with a high transfer priority will have its frames serviced before frames of a virtual connection with lower transfer priority. Additionally, eight discard priority (DP) levels are defined for a frame relay frame. Discard priority is defined per virtual connection and for each direction. Frames with lower discard priority level will be discarded first upon network congestion before frames with higher discard priority levels. Frame transfer priority and discard priority are set at the subscription time or by signaling.

Frame relay services typically include well-defined classes, which can be used for supporting services such as gold, silver, bronze. Each service is distinguished with different frame loss, delay, and jitter parameters. A standard frame relay data link connection (DLC) can only support a single service. The single service includes a two drop precedence that affects discard treatment, but not scheduling behavior. All frames belonging to a service must be delivered in order.

Existing standards such as the International Telecommunications Union (ITU) X.36 Standard defines transfer and discard priorities for frame relay virtual connections. ITU X.36 defines sixteen transfer priority levels (per virtual connection and for each direction), and eight discard priority levels (per virtual connection and for each direction). Frame relay frame transfer and discard priorities are set at subscription time or by signaling.

Figure 12:
FIG. 12 is a table of service levels.

Referring to FIG. 12, table 180 shows the frame relay service classes specified in the ITU X.146 Standard. Each class has different performance expectations. The performance expectations include network support 182, frame loss ratio 184, frame transfer delay 186, and frame delay variation 188. In general, frame relay standards support four service classes 190 (ITU-T X.146) differentiated by frame loss ratio 184 and frame delay 188 expectations. In accordance with the present invention, Ethernet services should be mapped to an equivalent frame relay service. For example, an Ethernet service class should be mapped to a frame relay service class with the same performance expectations in terms of loss, delay, and jitter.

As a specific non-limiting example, an Ethernet premium service with frame loss ratio<$10^{-3}$, frame transfer delay<200 ms, and frame delay variation<50 ms can be mapped to frame relay class 3 service. Frame relay class 1 and class 2 services are not adequate since class 1 and class 2 services do not satisfy some of the performance objectives. In this example, class 1 and class 2 services do not meet the required frame transfer delay 186 of <200 ms.

When a single service is supported, all frames are treated/scheduled equally by the IWF. The treatment is determined by Control Plane rules, which may be configured or signaled based on the connection transfer priority (TP), discard priority (DP), and/or QoS class. Multiple services can be supported on a single frame relay connection, in a value-added non-standard manner. In this case, the frame CoS indicators are used to derive the frame PHB (according to Control Plane rules). The CoS indicators can be based on multi-field or behavior aggregate classification. The frame relay frame per-hop-behaviors may be based on the p-bits, CFI, and IP DSCP, individually or in combination. The per-hop-behaviors determination may alternately or additionally use the MAC address, IP addresses, IP protocol Type, TCP/UDP port number, or any other L1-L7 fields individually or in combination.

Network Interworking Functions

In accordance with the present invention, functions performed by an IWF include control plane functions and data plane functions. As noted above, control plane functions are based on configuration and/or signaling data. An exemplary control plane function is the connection mapping between an EVC and the frame relay data link connection(s) (DLC). Control plane functions also include bandwidth profile mapping between Ethernet and frame relay connections. Control plane functions also define the rules for the data plane functions, for example, the mapping/interpretation of the p-bits to the Ethernet PHB, congestion and discard eligibility mapping, etc.

Data plane functions are those that effect the treatment of the user frames and are typically implemented as real-time functions. Exemplary data plane functions including changing the protocol header between Ethernet and frame relay, forwarding the frame to the chosen connection/queue and scheduling the connection onto the outgoing link. By way of example, assume an EVC carries VID 5, with a single bandwidth profile. The Ethernet frames received are classified with gold, silver or bronze performance depending on the setting of the p-bits (or other Layer 1-Layer 7 classification as described above). The EVC is mapped to a frame relay DLC by the IWF or to multiple frame relay DLCs, depending on the network option. The CoS can be asymmetrical.

Single COS

Figure 13:
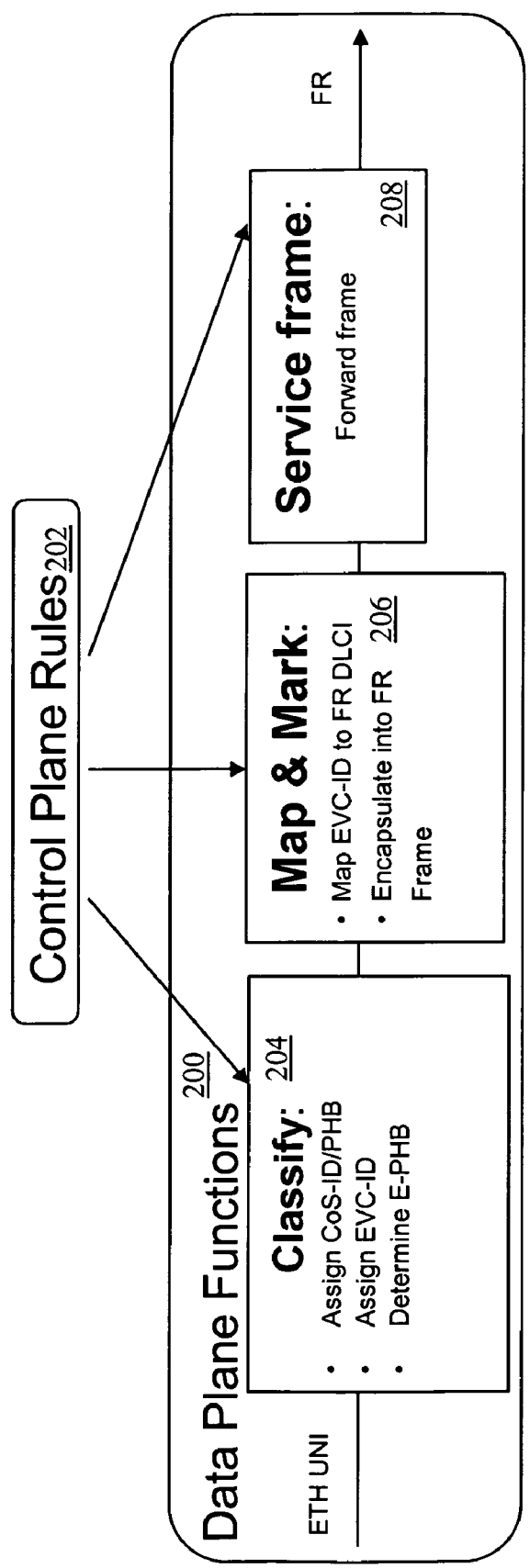
FIG. 13 is a block diagram of Ethernet to frame relay control plane rules and data plane functions.

Referring to FIG. 13, the IWF performs both control plane and data plane functions. For single CoS support, there is one-to-one mapping between a frame relay connection and an Ethernet virtual connection. An Ethernet virtual connection is typically identified by a port(interface) and/or one or more VLANs in which the EVC-ID is mapped to a frame relay DLC identifier (DLCI). In addition, the IWF maps the drop precedence (DP) and congestion indications (CI) from Ethernet to frame relay.

As is shown in FIG. 13, an IWF uses both data plane functions 200 and control plane functions as described by control plane rules 202 to service a frame between an Ethernet network and a frame relay network. The data plane functions include classification 204, mapping and marking 206, and servicing of the frame 208. The exact functions performed by the IWF for each of these steps can vary. Control plane rules specify the functionality.

Control plane rules 202 describe the classification 204, mapping/marking 206 and servicing 208 of the frame. The classification 204 includes the use of the Ethernet connection information (e.g., port, MAC, VID) and/or the p-bits in the Ethernet header. During the classification process, the IWF determines the Ethernet per-hop-behavior for the frame and assigns an EVC-ID and CoS-ID/PHB. Subsequent to the classification of the frame, the frame is mapped and marked. Mapping and marking can include encapsulation of the Ethernet frame into the frame relay frame and translating the Ethernet per-hop-behaviors to frame relay per-hop-behaviors and setting frame relay header bits, and mapping the drop precedence and congestion indications from Ethernet to frame relay, for example, setting the discard eligibility and the congestion bits. Subsequent to the mapping and marking of the frame, the IWF services the frame. Servicing 165 includes selecting the frame relay DLCI or queue and forwarding the frame based on the selection.

The IWF compliments the Metro Ethernet Network (MEN) edge data plane and control plane functions. Data plane functions 200 are compatible with the Metro Ethernet Forum (MEF) E-UNI functions of classification, metering and marking, which assign an EVC-ID and a CoS-ID/PHB to the Ethernet frame in which the PHB determines the scheduling treatment (PSC) and DP of the frame. Control plane functions for a session include mapping the EVC and its bandwidth profile to a corresponding frame relay connection that best meets the performance objectives associated with the EVC.

Figure 14:
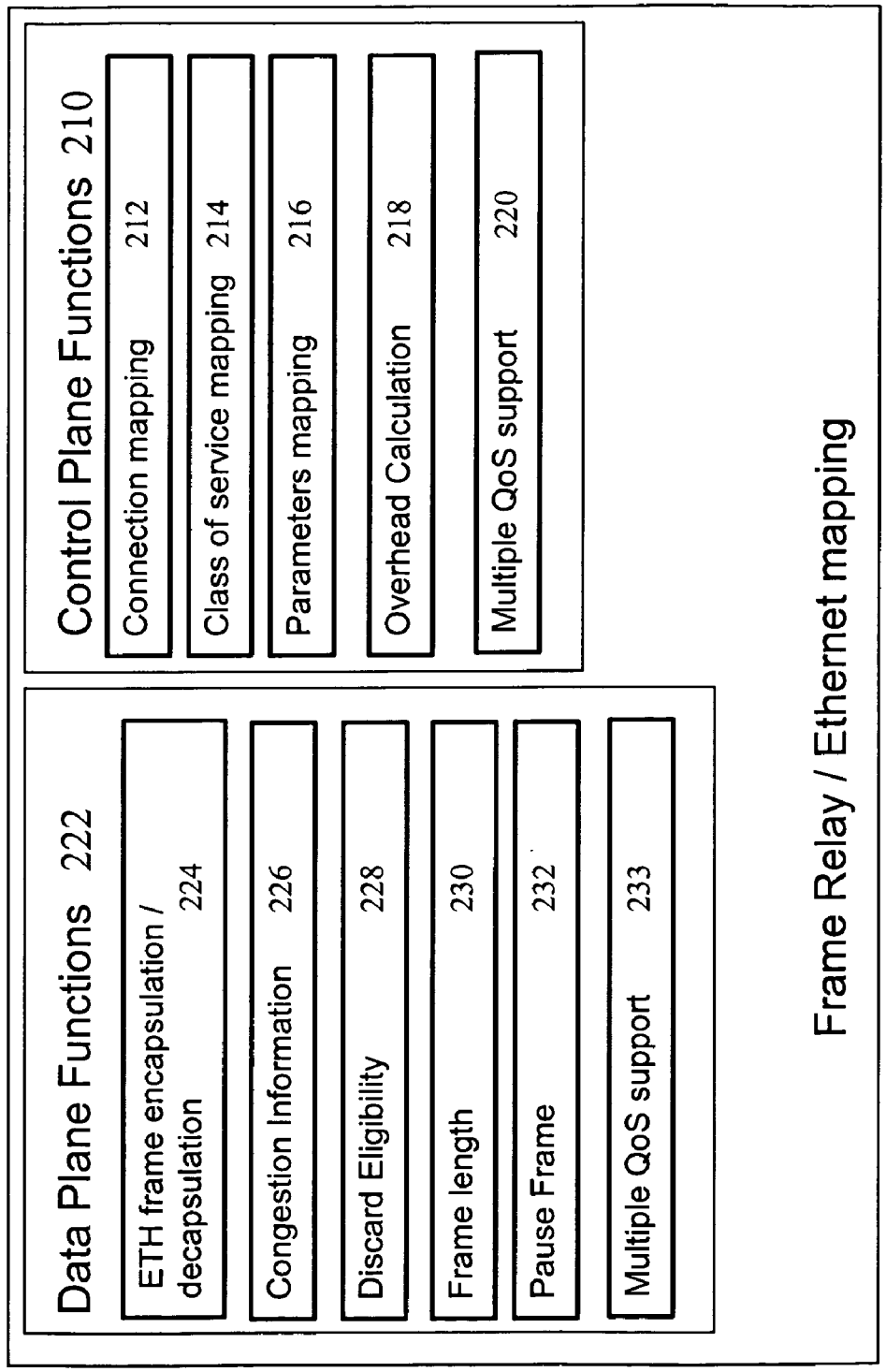
FIG. 14 is a block diagram of frame relay to Ethernet mapping parameters.

Referring to FIG. 14, interworking between an Ethernet network and a frame relay network can include mapping multiple functions in both the control plane and the data plane. The control plane functions 210 use configuration and/or signaling information that typically take place before any traffic is sent, and applies to all/many frames of a particular flow/connection. The control plane functions 210 support interworking and CoS functions such as connections set-up/mapping, traffic policing configuration, connection admission control and network resource reservation and allocation. These functions are categorized as connection mapping 212, CoS mapping 214, parameters mapping 216 and overhead calculation 218. Support for multiple CoS 220 is discussed below in detail.

Figure 15:
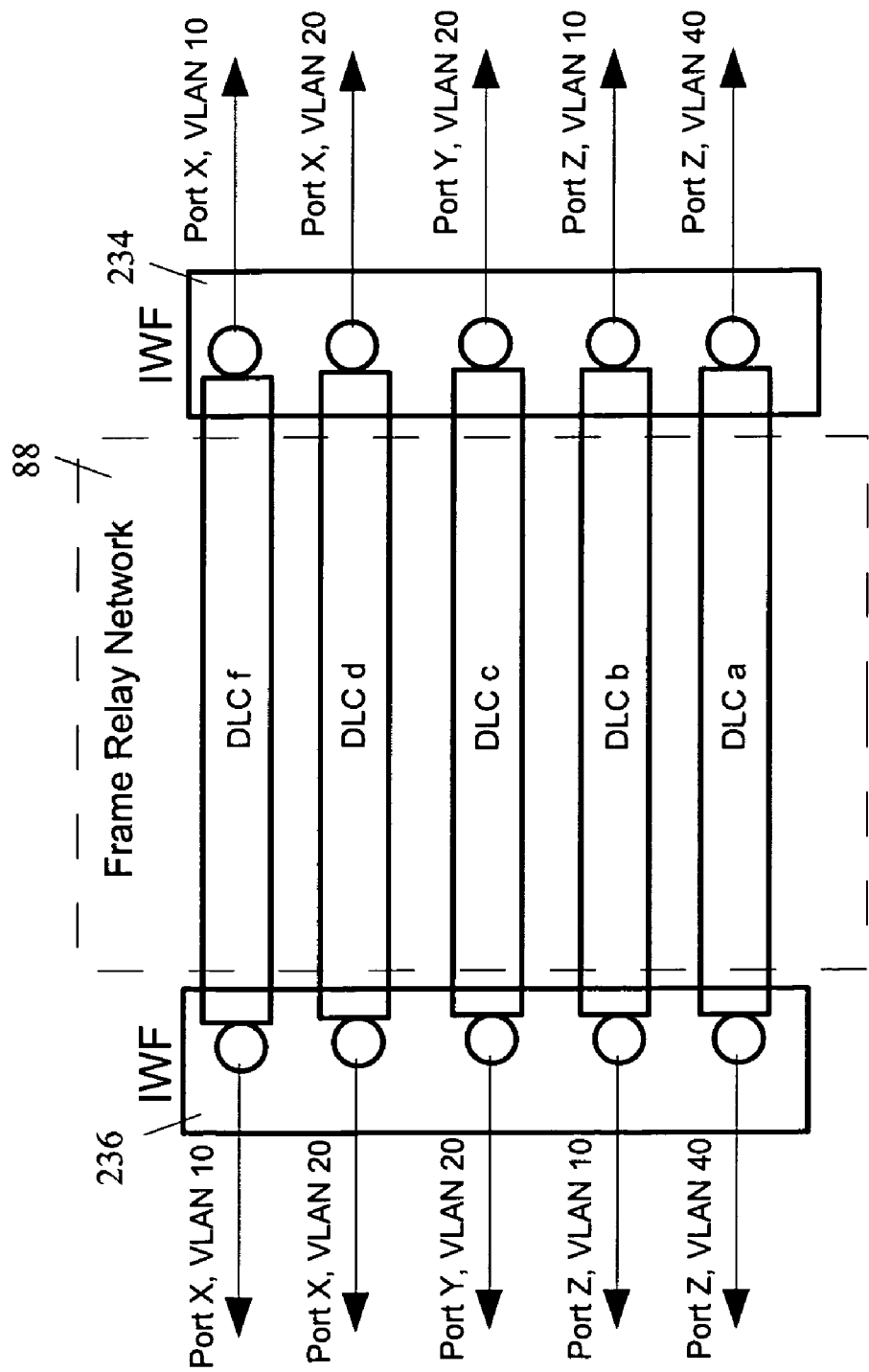
FIG. 15 is a block diagram of VLAN connection mapping and transport.
Figure 16:
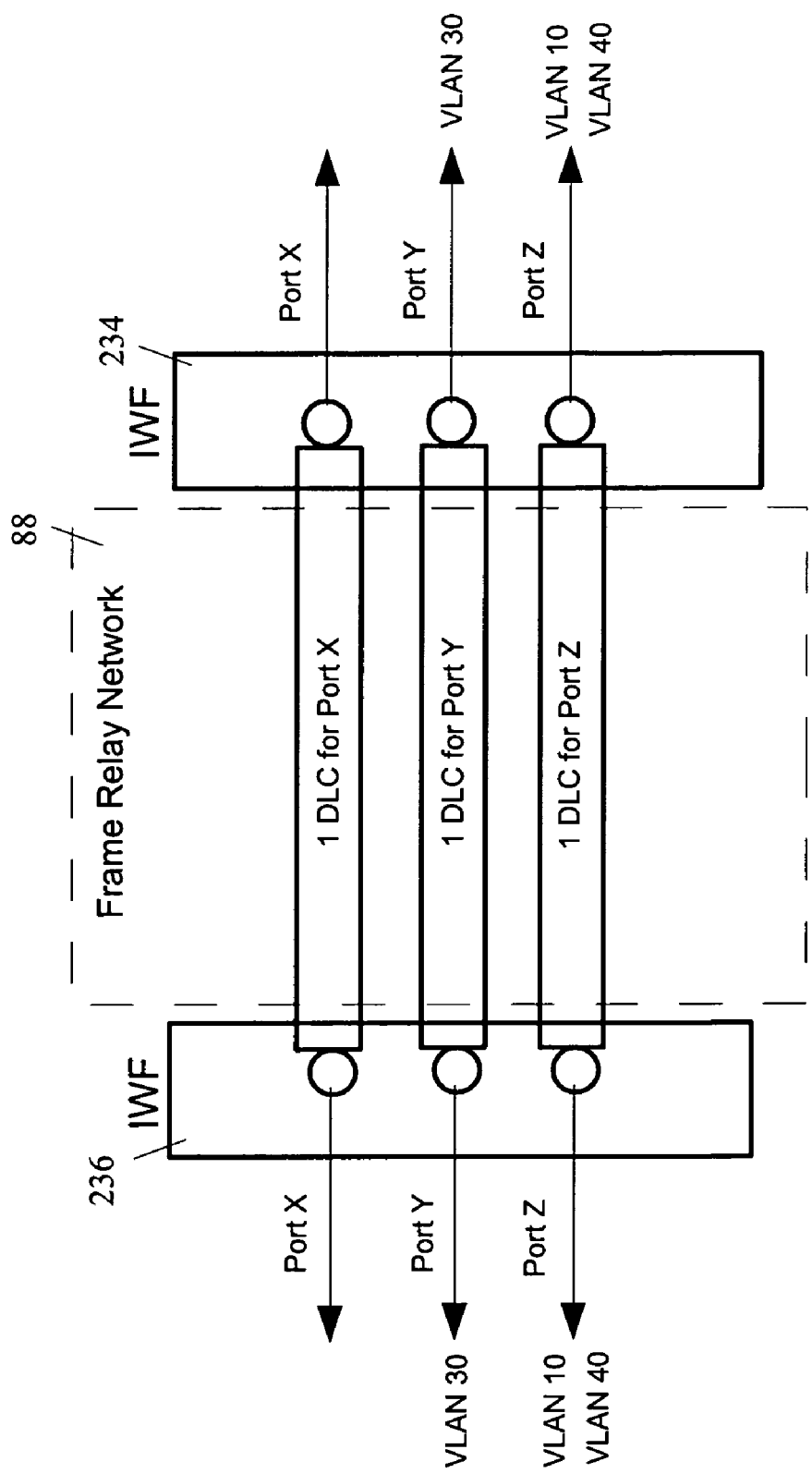
FIG. 16 block diagram showing an example of one to one interworking function port transport.

Connection mapping function 212 is described with reference to FIGS. 15 and 16. For single CoS support, the IWF maps all EVC frames to the same single frame relay DLC and all frames receive the same CoS treatment. In operation, the EVC-ID is mapped to the frame relay DLCI by the ingress IWF in the Ethernet to frame relay direction and the DLCI is mapped back to the EVC-ID at the egress IWF. As noted above, Ethernet value-added functions as are known in the art can be performed on the Ethernet user to network interface (UNI) side of the provider edge devices.

An example of VLAN connection mapping and transport is explained with reference to the diagram in FIG. 15. An IWF 234 and an IWF 236 are coupled to a frame relay network 88. In this example, five VLANs are transported between IWF 234 and IWF 236. Each VLAN is assigned a separate EVC and mapped to a separate frame relay DLC. This arrangement advantageously allows ports/VLANs to be switched to different destinations. In addition, because separate DLCs are used, isolation between VLANs in the frame relay core is provided, thereby improving security and bandwidth guarantee for each VLAN.

An example of one to one IWF port transport is explained with reference to the diagram in FIG. 16. In this example, three Ethernet ports are transported between IWF 234 and IWF 236. Each port x, y and z can optionally support the 802.1 Q tag and can carry 1 or more VLANs. In this example, each port is assigned a separate EVC and is mapped to its own frame relay DLC. This arrangement allows for network scalability and is compatible with legacy Ethernet interfaces that do not support VLANs. However, unlike the example of FIG. 14, all VLANs within a port are bundled together and must travel between the same pair of IWFs. As shown in FIG. 16, VLANs 10 and 40 are transported through frame relay network 88 in the DLC assigned to port Z. A third example (not shown) provides multiple, but not all, VLANs on the same port being mapped to a single EVC and mapped to a single FR DLC (referred to as bundling in MEF standards).

With respect to service class mapping (class of service mapping function 214) for a single CoS connection, the present invention supports mapping between ETH EVC and FR DLC service classes. Service class mapping is performed to ensure that the IWF meets the service class objectives. For example, a gold Ethernet service should be mapped to an equivalent service on the frame relay side and vice versa. Alternate mappings are permitted to allow for cases where the Ethernet and frame relay service classes do not match. Service class mapping sets the data plane functions of the IWF during frame processing. An example of service class mapping is provided above.

Figure 17:
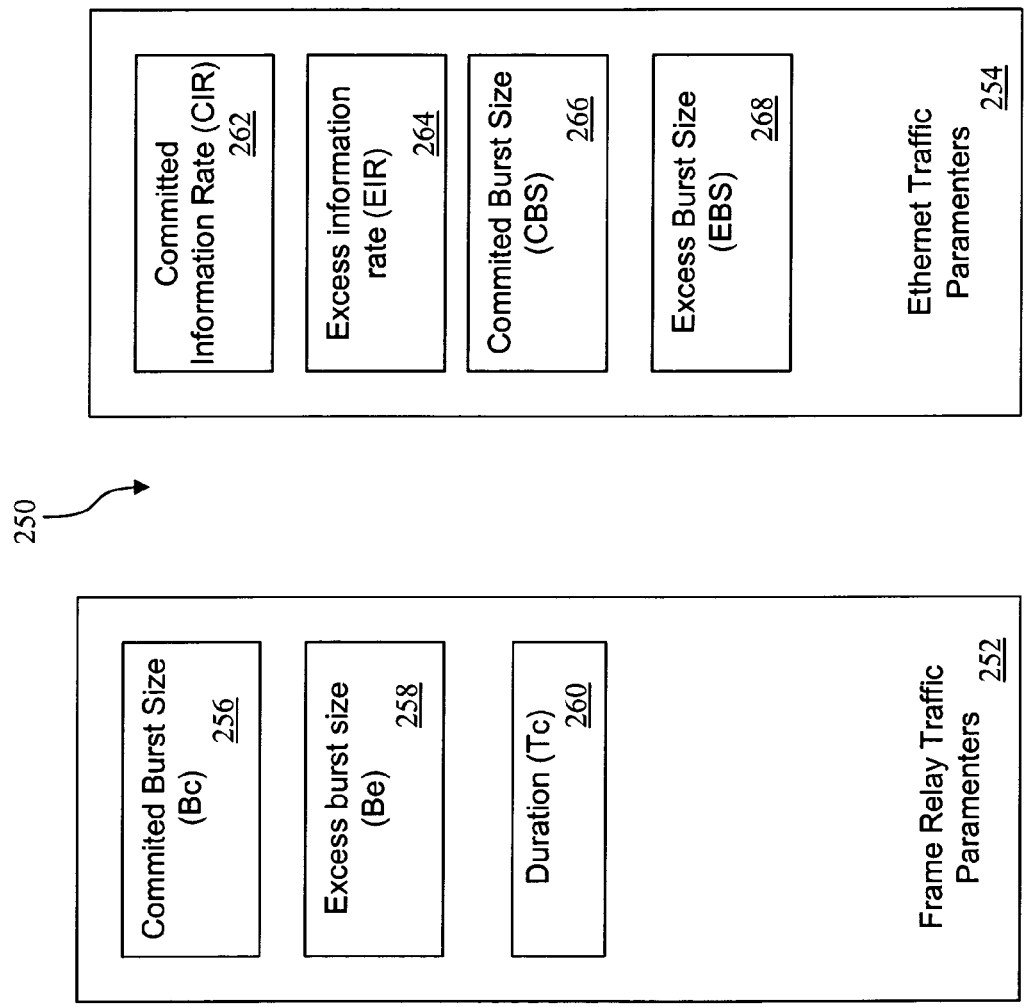
FIG. 17 is a block diagram of frame relay and Metro Ethernet Forum traffic parameters.

Traffic parameters mapping is discussed with reference to FIGS. 17-20. Referring to FIG. 17, a set 250 of parameters for a one-to-one mapping of an EVC to a frame relay DLC, namely frame relay traffic parameters 252 and a set of Ethernet traffic parameters 254 are shown. Traffic parameters may be used by many QoS functions: traffic policing and monitoring, BW reservation, admission control, and scheduler configuration.

The standard frame relay traffic parameters include committed burst size ($B_c$) 256 in bits, excess burst size ($B_e$) 258 in bits and Duration ($T_c$) 260 in seconds. At any time interval of duration $T_c$ 260, the frame relay end user is allowed to transmit frames up to its contracted $B_c$ 256 and $B_e$ 258 amount of information. Frame relay service rates including the committed information rate ($CIR_F$) and excess information rate ($EIR_F$) are derived from $B_c$, $B_e$, and $T_c$ as: $CIR_F=B_c/T_c$ and $EIR_F=B_e/T_c$.

Ethernet traffic parameters 254 can be based on the Metro Ethernet Forum Standard. The Ethernet traffic parameters 254 include committed information rate ($CIR_E$) 262 in bits per second, excess information rate ($EIR_E$) 264 in bits per second, committed burst size (CBS) 266 in bits, and excess burst size (EBS) 268 in bits. Other units may be used such as bytes/octets. The four Ethernet parameters described above are set independently.

Referring to FIG. 18, when a mapping function is set between a frame relay and an Ethernet connection, the IWF device calculates the traffic parameters. In the Ethernet to frame relay direction, the parameters for the frame relay network 260 can be calculated using the Ethernet traffic parameters 254 (shown in table 270). In a first example (shown in box 272) $B_c$=CBS, $CIR_F$=$CIR_E$, $EIR_F$=$EIR_E$. This assignment emphasizes the values of committed rate parameters ($CIR_F$, $B_c$), and $EIR_F$ as the main frame relay parameters. $B_e$ can be derived as $EIR_E*T_c=EIR_E*B_c/CIR_F$.

In a second example (shown in box 274) $B_c$=CBS, $CIR_F$=$CIR_E$, $B_e$=EBS. This assignment emphasizes the values of committed rate parameters ($CIR_F$, $B_c$), and $B_e$ as the main frame relay parameters. In a third example (shown in box 276) $B_c$=CBS, $B_e$=EBS, $T_c$=(CBS+EBS)/($CIR_E$+$EIR_E$). The choice for the Tc mapping is based on the need to limit the amount of information entering frame relay network to CBS+EBS over a period of time having a length $T_c$. This would be in agreement with frame relay specification even though CBS/$CIR_E$ and EBS/$EIR_E$ are not strictly equal. An allowance should be made for the burstiness of the traffic introduced by the IWF and intermediate network segments between the points of measuring the frame relay and Ethernet traffic parameters. The original Ethernet connection parameters are restored for packets traveling from Ethernet to frame relay.

Figure 19:
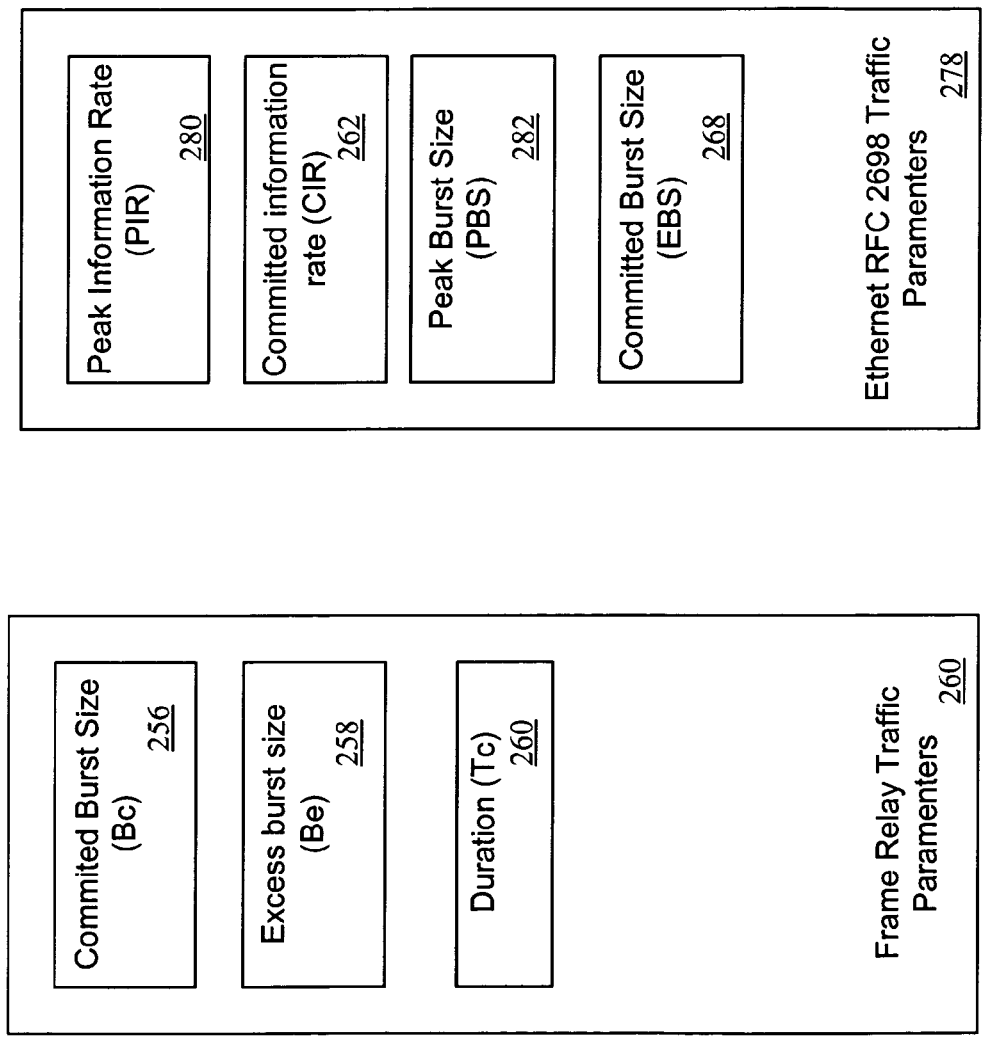
FIG. 19 is a block diagram of frame relay and Ethernet RFC 2698 traffic parameters.

Referring to FIG. 19, a set of frame relay traffic parameters 252 (as described above) and a set of RFC 2698-based Ethernet traffic parameters 278 are shown. RFC 2698-based Ethernet traffic parameters 278 include peak information rate (PIR) 280, committed information rate ($CIR_E$) 262, peak burst size (PBS) 282, and committed burst size (CBS) 268. The four RFC 2698-based Ethernet parameters are set independently.

Referring to FIG. 20, when a frame is forwarded between a frame relay network and an RFC 2698 Ethernet network the traffic parameters are calculated. In the Ethernet to frame relay direction, the parameters for the frame relay network 252 can be calculated using the Ethernet traffic parameters 278 (shown in table 284). In a first example (shown in box 286) when PBS>CBS, $CIR_F$=$CIR_E$, $B_c$=CBS, and $EIR_F$=PIR−CIR. This assignment emphasizes the values of committed rate parameters ($CIR_F$, $B_c$), and $EIR_F$ as the main frame relay parameters, however CE traffic shaping is required in this case to smooth the peak burst. The original Ethernet connection parameters are restored for packets traveling from Ethernet to frame relay. In a second example (shown in box 288) when PBS>CBS, $CIR_F$=$CIR_E$, $B_c$=$CB_S$, and $B_e$=PBS−CBS. This assignment emphasizes the values of committed rate parameters ($CIR_F$, $B_c$), and $B_e$ as the main frame relay parameters. In a third example (shown in box 290), PBS<CBS, $CIR_F$=$CIR_E$, $B_c$=CBS, and $EIR_F$=PIR−CIR. This assignment emphasizes the values of committed rate parameters ($CIR_F$, $B_c$), and $EIR_F$ as the main frame relay parameters. An allowance should be made for the burstiness of the traffic introduced by the IWF and intermediate network segments between the points of measuring the frame relay and Ethernet traffic parameters.

Overhead calculation function 218 (in FIG. 14) is discussed. Referring back to FIG. 8, the Ethernet over frame relay frame format 130 includes more overhead compared to that of the Ethernet frame 42. In fact, for a data unit of size n bytes, a tagged Ethernet adds 22 bytes of overhead for a total Ethernet frame size of n+22 bytes (the header length calculation excludes the preamble and SFD fields). The Ethernet overhead $h_E$=22 bytes in this case ($h_E$=18 bytes for untagged frames). Also, the frame relay header includes fields in the frame relay frame other than the data field. Ethernet encapsulation using frame relay adds overhead of (1) 4 bytes for the frame relay header (assuming the common two-bytes address filed format), (2) 8 bytes for an RFC 2427 bridged mode encapsulation header and (3) an Ethernet header of 22 bytes when an Ethernet FCS is used and 18 bytes when an Ethernet FCS is not used. Accordingly, the transmission of n bytes of data requires n+34 bytes if an Ethernet FCS is transported over the frame relay network and n+30 bytes if the Ethernet FCS is not transported. The indicated FR overhead value (denoted $h_F$) is reduced by 4 bytes when encapsulating untagged Ethernet frames.

A correction factor maps rates between Ethernet and frame relay networks. The value of the correction factor depends on the length of the data field. For data field of length 'n' bytes and assuming no fragmentation, the correction (overhead) factor, 'a' is equal to $(n+h_E)/(n+h_F)$. Based on this correction factor, in the Ethernet to frame relay direction $CIR_F=CIR_E/a$ and $EIR_F=EIR_E/a$. In the frame relay to Ethernet direction, the original Ethernet parameters are restored, i.e., $CIR_E=a*CIR_F$ and $EIR_E=a*EIR_F$. The calculations are carried out in control plane (per connection), not for every frame. They are typically done in SW however they could also be completed by hardware/firmware configured to perform the appropriate functions.

Referring again to FIG. 14, data plane functions 222 are performed on every frame, typically in real time, and include examining and mapping/setting the frame header information, forwarding the frame through the network, possible frame discard, and the like. The data plane functions are performed on every frame, typically in real-time. The control plane rules impact/configure the data plane functions 210, and are typically changed infrequently in non-real-time. The data plane functions can include, for example, Ethernet frame encapsulation of frame relay by the ingress IWF and de-capsulation at the egress IFW (discussed above in detail) 224, congestion information 226, discard eligibility 228, frame length 230 a pause frame 232 and provide functions to support multiple QoS 233.

Figure 21:
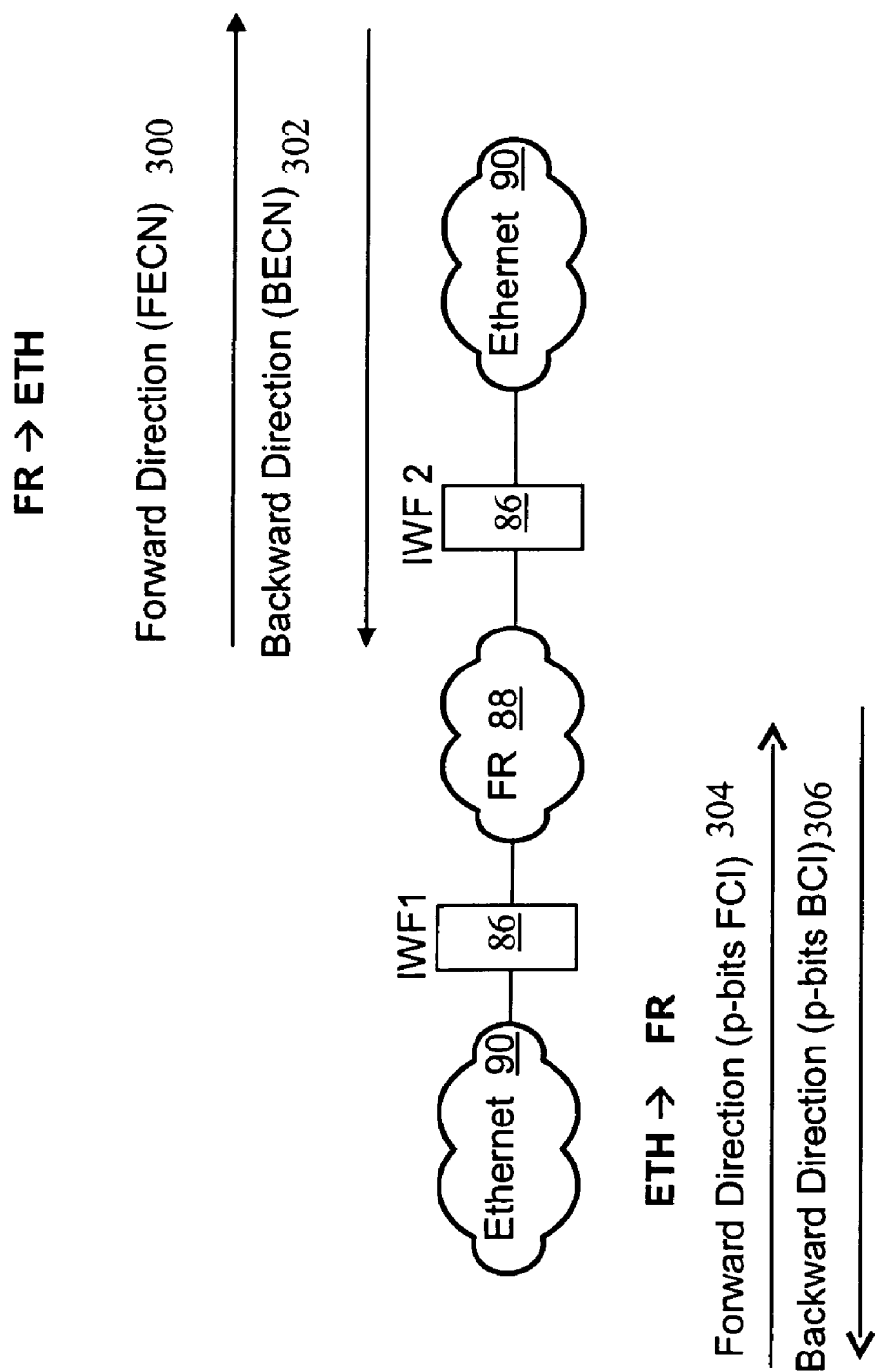
FIG. 21 is a block diagram showing congestion indications.

Referring to FIG. 21, a frame can include congestion indication options via congestion information function 174. Frame relay frames include forward explicit congestion notification (FECN) and backward explicit congestion notification (BECN) indications in the header. In a frame relay network, FECN is a header bit that may be set by a network device to indicate congestion in the source-to-destination forward direction. The destination device/receiver may then notify the sender to reduce its traffic rate to alleviate network congestion. BECN (backward explicit congestion notification) is a header bit that may be set by a network device to indicate congestion in the reverse destination-to-source backward direction. The destination device/receiver may then reduce its traffic rate to alleviate network congestion. FECN and BECN are intended to minimize the possibility that frames will be discarded (and possibly have to be resent) when a greater number of packets than can be handled travel through the network. FECN and BECN indication mapping between the frame relay network 88 and the Ethernet network 90 can be carried out, if the priority bits (p-bits) in a tagged Ethernet frame are assigned for carrying congestion information. Alternately or in addition, the congestion indication can be specified by the CFI field.

In the Ethernet to frame relay direction, multiple options exist for mapping the FECN and BECN bits. In a first option for mapping the FECN bits in the forward direction 304, the Ethernet p-bits forward congestion indication (FCI) is not mapped to the frame relay FECN and the FCI field is carried unchanged through the frame relay network 88. In a second option, the Ethernet p-bits BCI is set in the frames traveling in the frame relay to Ethernet direction. For mapping in the backward direction 306, options for mapping of the BECN bits include (1) carrying the Ethernet BCI fiend unchanged in the Ethernet header, (2) setting the BECN bit in the frame relay header if the FECN was set in the last frame received in the frame relay to Ethernet direction to notify the remote IWF of congestion and (3) mapping the p-bits BBCI to the BECN bit in the frame header to provide the frame relay network 88 with the option to throttle/regulate traffic traveling to the Ethernet network 90 in the opposite direction.

In the frame relay to Ethernet direction, for mapping the FECN bits in the frame relay frame to the Ethernet frame, the FECN field is mapped to a combination of p-bits that indicate the forward congestion. If FECN is set, BECN should also be set for frames traveling in the Ethernet to frame relay direction. This allows the congestion feedback function to be sped up and allows the remote IWF (IWF 2 in the case of FECN 300) to throttle traffic. For mapping of the BECN bits in the backward direction 302, the BECN bits can be ignored or a p-bit backward congestion indication (BCI) value may be mapped to BECN value in Ethernet frame. Accordingly, the p-bit BCI will be set if either the Ethernet network 90 or the frame relay network 88 signals congestion in the backward direction.

Referring back to FIG. 14, discard eligibility function 228 indicates frames to discard when the network is congested. Recall that the Ethernet PHB may indicate frame discard treatment. As another option, discard eligibility mapping can be restricted to tagged Ethernet frames which use the p-bits and/or the Ethernet CFI field. Although this option is more limited than use of the Ethernet PHB, it is simpler to implement, especially in the case where the incoming Ethernet frames do not use/support rich classification functions. Also, this option is independent of the upper layer protocol.

The discard eligibility indication is a measure of the frame importance within a service/flow. The frame can be marked by the user, or set by the network policies based on the traffic contract and user sending rate. Discard eligibility can be mapped from the frame relay frame to the Ethernet frame if discard eligibility is available on the Ethernet side. Discard eligibility on an Ethernet network can be included in p-bits or an equivalent mechanism such as the CFI field.

In the Ethernet to frame relay direction, discard eligibility mapping is applicable if tagged Ethernet frames include p-bits for discard eligibility indication. The p-bit/original drop precedence indication can be carried unchanged in the Ethernet header. As one option, the Ethernet frame drop precedence (p-bits indication) is mapped to frame relay discard eligibility. The PHB can indicate up to three drop precedences/colors. Metro Ethernet forum describes Ethernet frames as having a level of service indicated by a particular color. For example, green indicating conformant, yellow indicating excess, and red indicating traffic contract violation. The behaviors associated with the different colors can be mapped to particular discard eligibilities in the frame relay frame. For example, for green Ethernet frames the IWF sets discard eligibility in frame relay header to '0' and for yellow Ethernet frames the IWF sets discard eligibility in frame relay header to '1'. Red frames are optionally dropped by the IWF or forwarded to the network with discard eligibility in frame relay header set to '1'. As another option, no mapping can be performed.

In the frame relay to Ethernet direction, the discard eligibility bit can be mapped to a corresponding Ethernet drop precedence indication, such as one of the eight p-bits combinations, depending on Ethernet service definition (as described in "ETHERNET DIFFERENTIATED SERVICES" by Sameh Rabie, et. al U.S. patent application Ser. No. 10/868,536). In other words, the Ethernet frame drop precedence indication will be set if ether the Ethernet or frame relay network set it. Alternately, no mapping is performed from frame relay to Ethernet. The Ethernet header/p-bits drop precedence preserves its original value at the Ethernet to frame relay IWF. Such a mode is useful for carrier to carrier implementations where the core carrier discard eligibility marking/policing is not to be made visible to the end users.

Another mappable data plane function shown in FIG. 14 is the frame length function 230. Frame length can also impact the forwarding treatment for the frame. The data field of the IEEE 802.3 frames is limited to 1518 bytes. 'Jumbo' frames can be larger than 1518 bytes on non-VLAN-aware interfaces and can be larger than 1522 bytes on VLAN-aware interfaces. Typically, jumbo frame can be up to approximately 9 K bytes. In the Ethernet to frame relay direction, frame relay Standards specify Max MTU as 8 K bytes, but different implementations and interfaces may support different values. For example, low-speed interfaces carrying multi-media traffic may have a smaller value. If the frame relay frame size exceeds the frame relay MTU and fragmentation is supported the IWF device fragments the frame, for example according to the FRF.12 standard. If the size of a frame exceeds the frame relay MTU and fragmentation is not supported, the IWF drops the frame. In the frame relay to Ethernet direction, the IWF device first performs FRF.12 frame reassembly, if applicable. Next the IWF drops the decapsulated Ethernet frames that exceed the maximum supported frame length in the egress Ethernet network.

Figure 22:
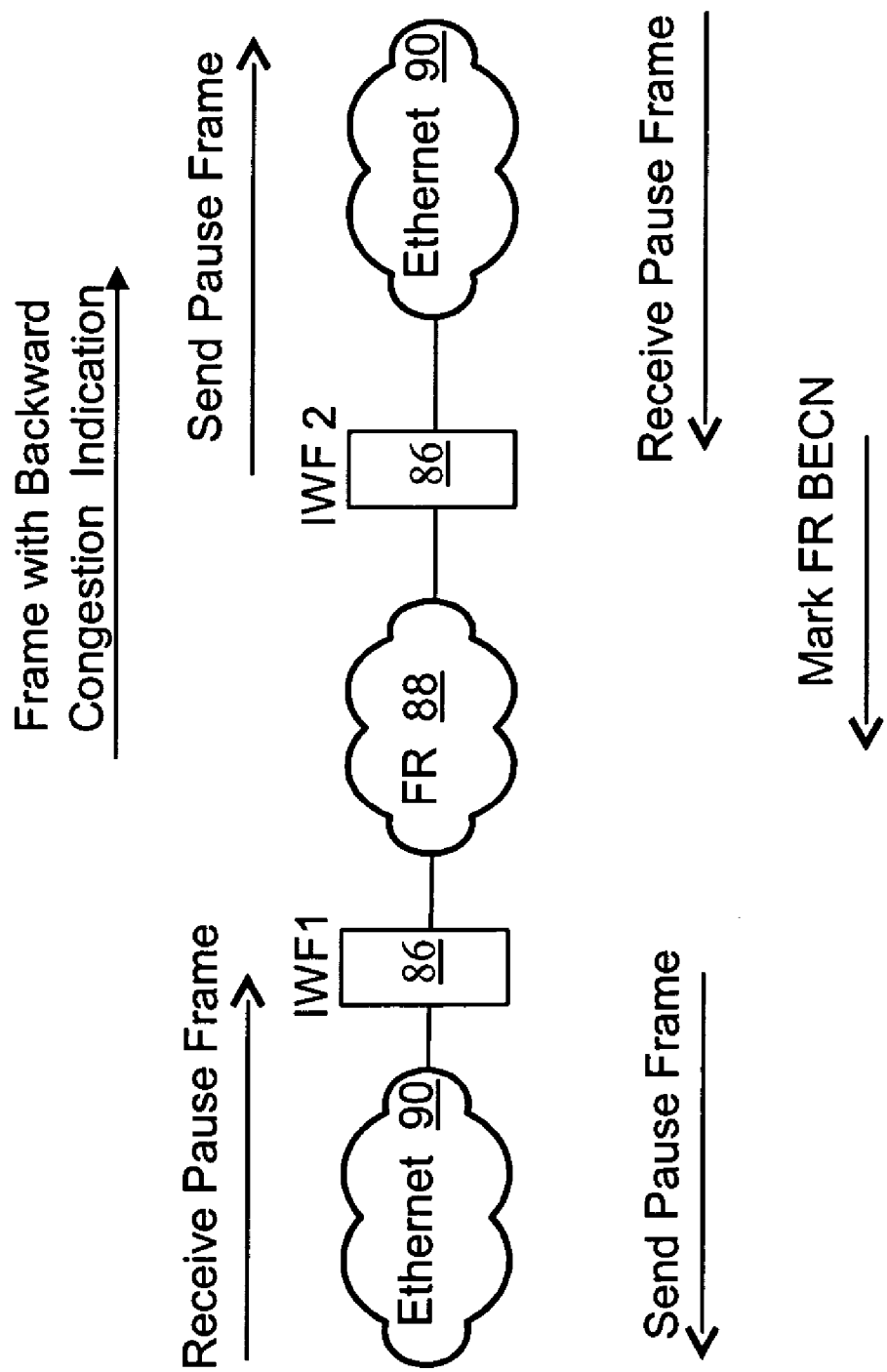
FIG. 22 is a block diagram of a network including the use of a pause frame.

Data plane functions also include a pause frame function 232 as shown in FIG. 14. Pause frame function 232 as used in network interworking in accordance with the present invention is described with reference to FIG. 22. The use of a pause frame allows flow control of traffic away from the frame relay core network. The pause frame stops all traffic on the device port, not on individual VLANs and is not CoS sensitive. Accordingly, pause frame function 232 is most useful for port mode transport of Ethernet over frame relay. Dropping frames at the network edge can increase the efficiency of the frame relay network because traffic is discarded at edge of the frame relay network instead of in the frame relay core.

If congestion exists in Ethernet to frame relay direction, the IWF allows dropping of frames at the edge of the network. The egress IWF 86 receives a frame relay BECN indication from the frame relay network 88. Subsequently, the egress IWF 86 sends a 'pause' frame to an Ethernet device on the destination Ethernet network 90. The pause frame requests the Ethernet device to stop sending frames to the frame relay network 88. The present invention contemplates an enhanced pause frame that can stop all traffic on the port or on individual VLANs. The enhanced pause frame can either be CoS sensitive or CoS may not impact the pause frame functionality.

Multiple Classes of Service

Unlike FR, a single Ethernet VLAN can support multiple CoS classes, for example premium, gold, and standard classes of services. Each class of service is identified by assigning a unique p-bit value to service frames. The EVC can be assigned a single bandwidth profile for the aggregate bandwidth for the whole EVC or be assigned multiple bandwidth profiles, i.e. a bandwidth profile for each service class or group of classes.

In the Ethernet to frame relay direction, the frame relay core can support multiple CoS using a variety of techniques. For example each class of service can be assigned a separate frame relay DLCI. As another example, a single DLCI can be used in which frames are scheduled into multiple queues based on their CoS indication, e.g., based on the p-bits value or IP DSCP in the frame header. In the frame relay to Ethernet direction, the original Ethernet frames are forwarded onto the destination Ethernet interface according to the Ethernet service class designation.

The IWF is arranged to support the various multiple CoS options for the EVC and match them to the frame relay transport capabilities. The following describes extensions to the control and data plane functions described above as applied for supporting multiple CoS EVCs.

In the Ethernet to frame relay direction for the multiple CoS case, the Ethernet CoS indicators are used to indicate the frame service class. The IWF data plane functions perform service class mapping in addition to all of the single CoS mapping functions described above (see FIG. 14). The control plane functions can include mapping of the EVC and its bandwidth profile(s) to the corresponding frame relay connection(s) and their parameters. The arrangement for the frame relay to Ethernet direction is similar.

Figure 23:
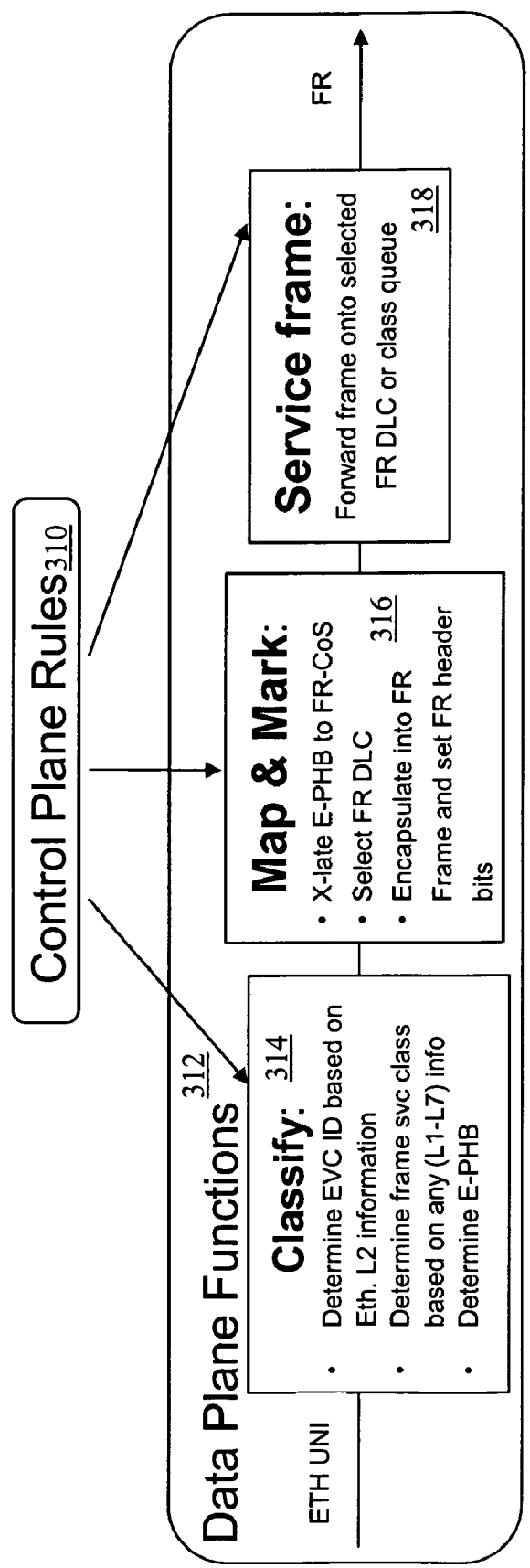
FIG. 23 is a diagram showing an exemplary typical service interworking process for multiple CoS implementations for frames being transported from an Ethernet network to a frame relay network.

FIG. 23 is a diagram showing an exemplary typical service interworking process at the ingress IWF for multiple CoS implementations. As shown in FIG. 23, control plane rules 310 in the IWF control data plane functions 312. In the Ethernet to frame relay (ingress) direction, when an Ethernet frame arrives at the IWF, the Ethernet frame is classified 314 to (1) determine the EVC ID based on the L2 Ethernet information, (2) determine the frame CoS based on any Layer 1-7 information and (3) determine the Ethernet PHB.

The Ethernet frame is mapped and marked 316 to (1) translate the Ethernet PHB to a frame relay CoS, (2) select a frame relay DLC, (3) encapsulate the frame into a frame relay frame and (4) set the frame relay header bits, e.g. the DE and congestion bits. The marked and mapped frame is then serviced 318 to forward the frame onto the selected frame relay DLC and to schedule the frame for transmission on the frame relay link.

Referring to FIG. 14, data plane functions 222 that are included in frame processing for multiple Ethernet service classes (CoS) are supported for each EVC. In the case where multiple frame relay DLCs are used, the Ethernet frame service class is used to select the outgoing frame relay DLC in the Ethernet to frame relay direction. In general, the Ethernet frame service class can be determined based on the Ethernet header p-bits, the CFI field and/or protocol layer information such as VID or IP DSCP.

In sum, in the Ethernet to frame relay direction, control plane rules 310 are used to determine (1) how the Ethernet frame service class will be determined, (2) the mapping rules from Ethernet to frame relay service classes and (3) the service classes associated with each frame relay DLC. The incoming frame is processed by (1) determining the Ethernet frame service class, (2) mapping the Ethernet service class to the closest, i.e. corresponding, frame relay service class and (3) forwarding the frame onto the frame relay DLC that supports the mapped frame relay service class. In the frame relay to Ethernet direction, the frame relay header/information is removed and the received frames are forwarded according to the original Ethernet service class.

With reference to FIG. 14, connection mapping function 212 for multiple CoS applications is described. For Ethernet EVC mapping to frame relay, the EVC can be mapped to frame relay using different methods depending on the extent of EVC CoS support, the frame relay network capability and available CoS options. These options include (1) using a single legacy frame relay DLC with a single CoS in the frame relay core, (2) using multiple legacy frame relay DLCs to support multiple CoS, e.g. gold, silver and/or bronze DLCs, and (3) using a single multi-CoS frame relay DLC that is capable of supporting multiple CoS based on frame CoS indication such as the Ethernet P-bits or IP differentiated services.

Figure 24:
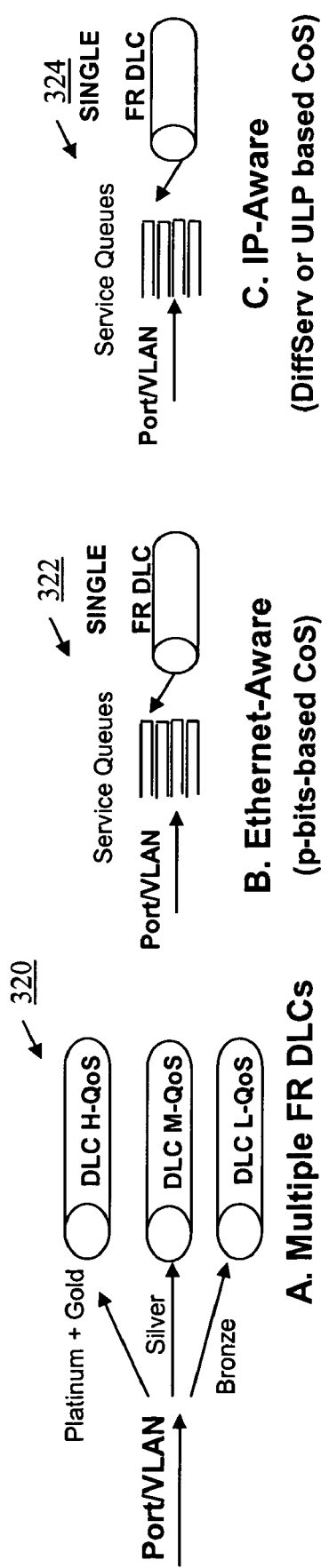
FIG. 24 is a diagram showing three examples of multiple CoS connection mapping.

FIG. 24 shows three examples of multiple CoS connection mapping. Example A 320 shows the case where multiple frame relay DLCs can support one or more Ethernet service classes by mapping a port/VLAN to a level of service for a DLC. Example B 322 shows the case where a single frame relay DLC can be used by service queues having p-bit awareness, i.e. p-bit arrangements are mapped to a DLC queue. Example C 324 uses a single frame relay DLC in which the service queue has awareness of the ULP or IP differentiated service. In the cases of Examples B 322 and C 324, traffic can arrive out of order, but traffic within each service class would always arrive in order. A class-based scheduler can be used in these cases for scheduling the multiple service classes onto the single frame relay DLC. As such, the frame relay DLC CoS should be capable of supporting the highest Ethernet service class. It is also contemplated that a frame relay DLC or group of DLCs can be replicated for load sharing and resiliency.

Figure 25:
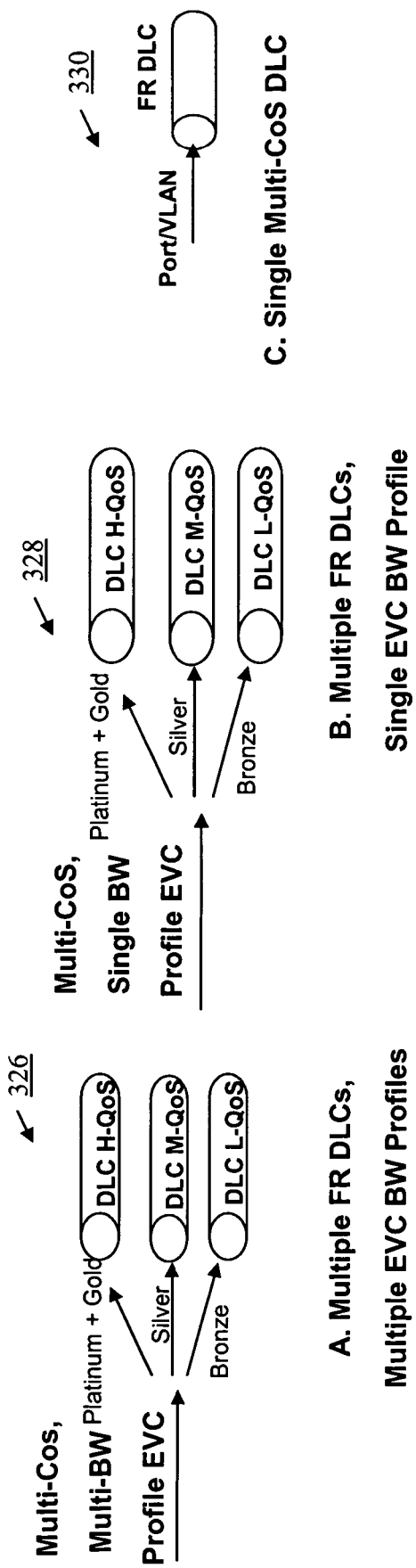
FIG. 25 is diagram showing three examples of bandwidth profile mapping in the Ethernet to frame relay direction.

FIG. 25 shows three examples of bandwidth profile mapping in the Ethernet to frame relay direction. In this arrangement, the bandwidth profile mapping will build on the parameter mappings and overhead calculations described above for single CoS EVC connections. Examples A 326 and B 328 are applicable when multiple DLCs are used. Example A 326 shows the case where multiple EVC profiles are used and each EVC bandwidth profile is mapped to a corresponding frame relay DLC. Example B 328 shows the case where a single EVC bandwidth profile is supported by estimating the percentage of EVC traffic mapped to each frame relay DLC. Single CoS parameter rules are applied separately to each EVC class/DLC pair.

Example C 330 shows the case where a single multi-CoS DLC is used. If there are multiple EVC bandwidth profiles, the EVC bandwidth profiles are aggregated before mapping to the frame relay DLC bandwidth profile. If there is a single EVC bandwidth profile, the same rules as described above for the single CoS mapping are applied.

FIG. 26 shows an example of the flexibility provided by the present invention in mapping between Ethernet p-bits and frame relay connections for different frame relay connection TP and DP values. Table 340 shows an example where the Ethernet p-bits support five service classes, representing five forwarding classes, with some classes supporting multiple drop precedence values, and a frame relay service that supports three services having various delay and loss guarantees. Although three frame relay services are used in this example, it is contemplated that the present invention can be arranged to support any combination of frame relay services and Ethernet service classes. In this example, the frame relay DE bit is used to represent drop precedence of the frames within a service class.

By way of example, row 342 shows the mapping of a "gold" Ethernet service class for an Ethernet PHB value of AF31, defined by p-bits value "110" to a real-time frame relay service class assigned to frame relay DLC ID 1, represented by frame relay connection with TP 15 and DP 7, with the frame relay discard eligibility bit set to "0".

In sum, for multiple CoS support for frames traveling in the Ethernet to frame relay direction, (1) each Ethernet service class can be assigned to a separate DLC, (2) a subset of the service classes can be mapped to a single frame relay DLC or (3) all service classes can be mapped to a single frame relay DLC. For example, an Ethernet connection that supports "gold" and "silver" services should be mapped to two frame relay DLCs having matching CoS, with the "gold" and "silver" traffic parameters being mapped to the corresponding frame relay DLC parameters. If two or more Ethernet services are combined into a single DLC, their aggregate traffic can be represented by a single traffic descriptor at the Ethernet and frame relay sides. For frames traveling in the frame relay to Ethernet direction, the original Ethernet frames are forwarded to the destination Ethernet interface or VLAN using the Ethernet CoS/service designation. Class-based scheduling/queuing are used for each egress Ethernet interface and/or VLAN to support priority treatment of higher Ethernet service classes. This is accomplished by using the EVC CoS parameters.

In sum, for transporting EVCs in the core frame relay network, the connection is mapped, bandwidth profile mapping is performed, CoS mapping is performed and the DP is mapped to the corresponding core frame relay network DP. With respect to connection mapping, the core connection service classes should be able to support the performance requirements for the various EVC CoS classes, e.g. bronze, silver, and gold. Each EVC can be mapped 1:1 to a corresponding core connection, but multiple EVC classes can be combined into the same core connection to simplify network operations. With respect to bandwidth profile mapping, this mapping should be implemented based on the estimate of traffic volume directed to each core connection. For example, if 30% of the EVC traffic is determined to be "gold" and is directed to a frame relay connection used exclusively for "gold" traffic, the bandwidth of the frame relay DLC can be estimated accordingly.

Ethernet Connections Multiplexing

In accordance with the present invention, an IWF can optionally multiplex multiple EVCs that terminate on the same IWF into the same frame relay core. This arrangement results in increased core network scalability and efficiency through sharing and aggregation. In this embodiment, as with other described embodiments, each EVC can be identified by a port, port+VID(s) or MAC address. Also, the multiplexed EVCs can belong to one or more customers and can span multiple UNIs. In this embodiment, the shared frame relay core provides the same options described above, namely, a single DLC with a single service class, multiple single-CoS DLCs or a single multiple-CoS DLC. Ethernet frames are de-multiplexed in the frame relay to Ethernet direction using the EVC identifier, which should be unique with the MEN or at least within the aggregate.

Ethernet connection multiplexing can preferably be implemented using a number of methods. According to one method, the EVC's traveling between the same IWFs can be aggregated and multiplexed. The aggregated EVCs can be mapped onto the frame relay core. According to another method, the EVCs can be directly mapped/multiplexed onto the frame relay core without being aggregated. These methods are described below in detail with reference to FIGS. 27-30.

Figure 27:
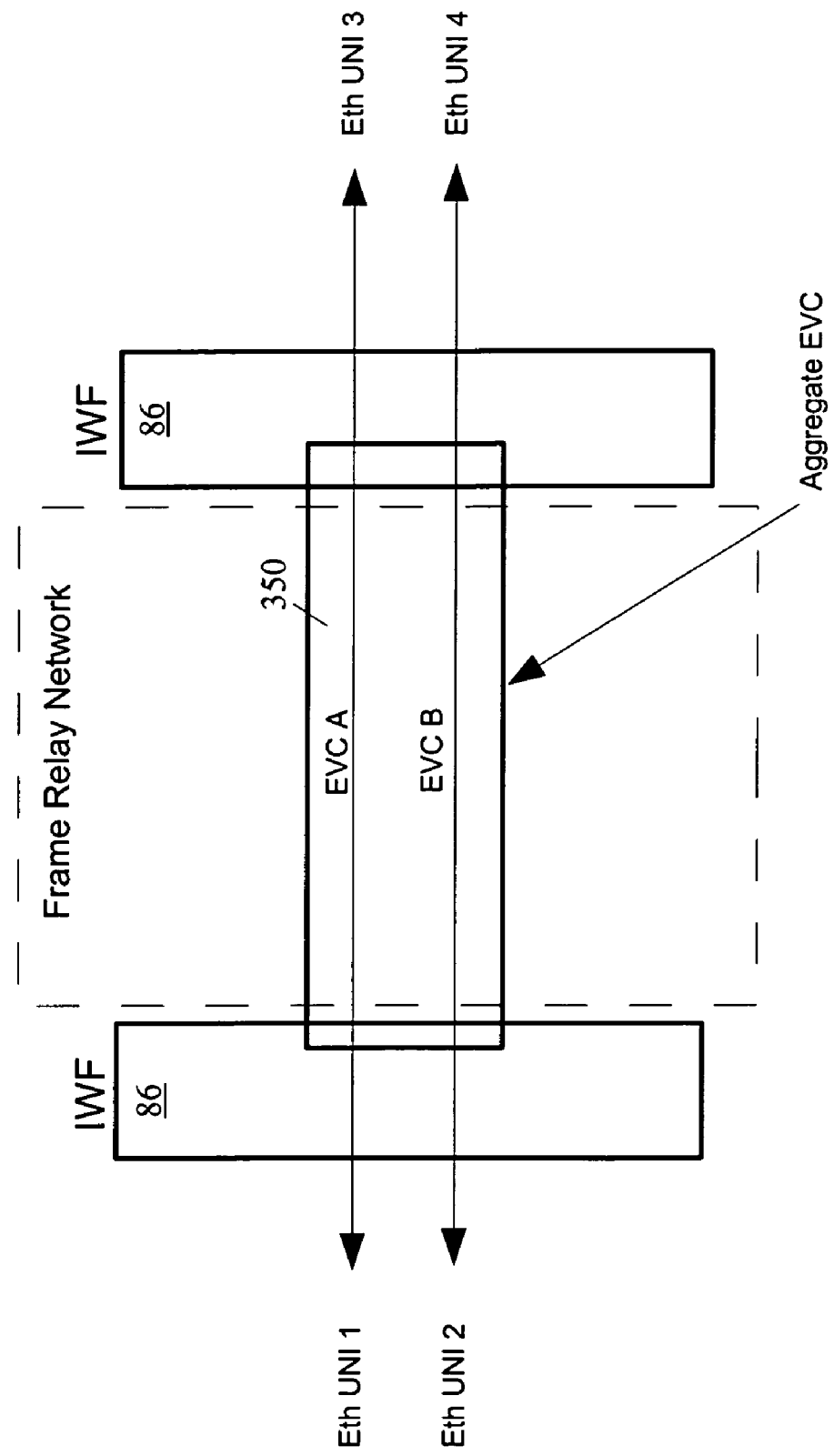
FIG. 27 is a block diagram of aggregate EVCs transported over a frame relay network.

Aggregate EVCs are described with reference to the diagram of FIG. 27. Aggregate EVC 350, comprised of EVC A and EVC B is transported across core frame relay network 88 between IWFs 86. Of note, although many of the drawing figures herein use IWFs 86 as exemplary IWFs, it is understood that this is done for ease of explanation and expediency. IWF functions integrated as part of other devices, such as frame relay CE devices 84 can readily be used. Because an EVC is defined between two UNIs, an aggregate EVC that includes multiple EVCs that have the same end points can likewise be defined. As is shown in FIG. 27, aggregate EVC 350 can be defined because EVC A and EVC B share the same IWF end points.

The EVCs are distinguishable at the egress IWF to allow demultiplexing of the frames onto the various UNIs. For example, the UNI MAC addresses must be globally unique throughout the MEN. In the alternative, tunneling may be used in the core frame relay network 88, when the IWF assigns a unique label to the frames belonging to each EVC. Examples of tunneling include but are not limited to Ethernet MAC-in-MAC or Q-in-Q. The bandwidth profile of the aggregate EVC should be based on the summation of the BW profiles of its constituent EVCs. Allowance for over-booking and statistical sharing can optionally be made. The class of service for the EVC frames can be preserved in the aggregate EVC or mapped to different tunnel CoS indicators based on the configuration. The same CoS mappings are typically applied to all EVC frames. However, it is contemplated that different CoS mappings can be implemented for the individual EVCs to suit individual design and performance requirements.

The methods and arrangements described above for non-aggregate EVC transport through system 10 are applicable to aggregate EVC transport as well and are based on aggregate EVC CoS support, frame relay network capabilities and QoS options. As discussed above, three exemplary methods include (1) using a single legacy frame relay DLC with a single CoS in the core, (2) using multiple legacy frame relay DLCs which support multiple CoS and (3) using a single multi-CoS frame relay DLC in which the DLC is arranged to support multiple CoS based on the frame CoS indication.

Admission control is also defined for the multiplexed EVC embodiment in the case where multiple EVCs map to a DLC. In the multiplexing case, there is no one to one correspondence between traffic parameters of the Ethernet and frame relay connections. However, the concepts explained and formulas described for the non-multiplexing cases for traffic parameters and over-head calculation can help with the connection admission control function. For example, hierarchical connection admission control (CAC) is typically performed for admitting the first DLC on the link and next for admitting the EVCs onto the DLC.

Initially, the frame relay DLC is configured with enough bandwidth to accommodate the total anticipated Ethernet traffic between the two IWFs. An admission control function is typically performed admitting the DLC on the physical or logical link. The "equivalent" bandwidth of the DLC is next computed. This bandwidth provides the virtual pipe capacity that's used to admit the Ethernet connections.

Next, the CAC function is executed for admitting the Ethernet connections on the frame relay pipe. The equivalent bandwidth of the Ethernet connection is calculated from its traffic parameters, overhead conversion, required QoS, the size of the frame relay connection and the underlying link capacity. If multiplexed Ethernet connections are transported over multiple frame relay DLCs, the bandwidth management function should account for each service class/DLC separately. This can be done from the EVC's service class bandwidth profiles or by calculating an estimate of the bandwidth profile for each DLC if the EVC bandwidth profile is not broken down to the service class level.

A number of Ethernet multiplexing scenarios for a single CoS are described herein. These scenarios include port aggregation, VLAN aggregation and partial VLAN aggregation. Each of these examples build on the non-multiplexing interworking methods described earlier. Of note, although a single CoS case is described, it is assumed that one of ordinary skill could extend the description herein to multiple CoS implementations.

Figure 28:
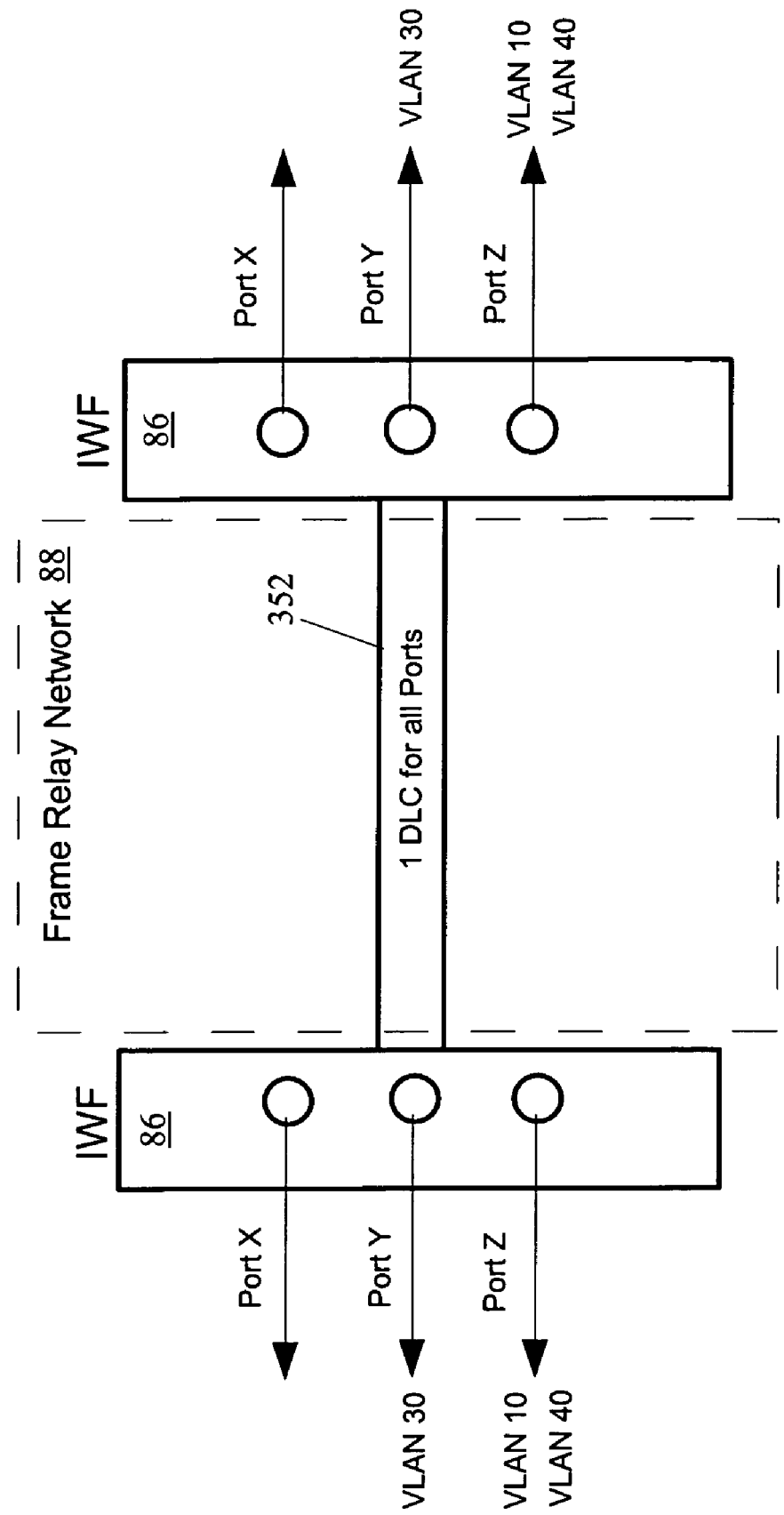
FIG. 28 is a block diagram showing an example of port aggregation.

Port aggregation is explained with reference to the diagram of FIG. 28. In this example, "n" Ethernet ports or EVCs, i.e., with or without VLAN support, are multiplexed into one frame relay DLC. Each port is treated by IWF 86 as a single connection and, if applicable, all VLANs on the port are carried transparently. This arrangement is readily scalable. As shown in FIG. 28, Ports X, Y and Z in which port Y carries VLAN 30 and port Z carries VLAN 10 and VLAN 40 are multiplexed into a single DLC 352. It is contemplated that multiple DLCs (not shown) can be used for load sharing and resiliency.

It is also contemplated that, as a variation, the bridging function can be implemented by aggregating different ports on the IWFs 86. As such, ports X, Y and Z can be connected to a single port at the egress IWF 86. Traffic can be separated at the egress IWF 86 as long as the MAC source and destination address combination is unique. If MAC addresses are not unique, port aggregation can not be used or some other aggregation scheme, such as MAC-in-MAC or Q-in-Q is required at the ingress IWF 86 to enable the connections to be separated.

Figure 29:
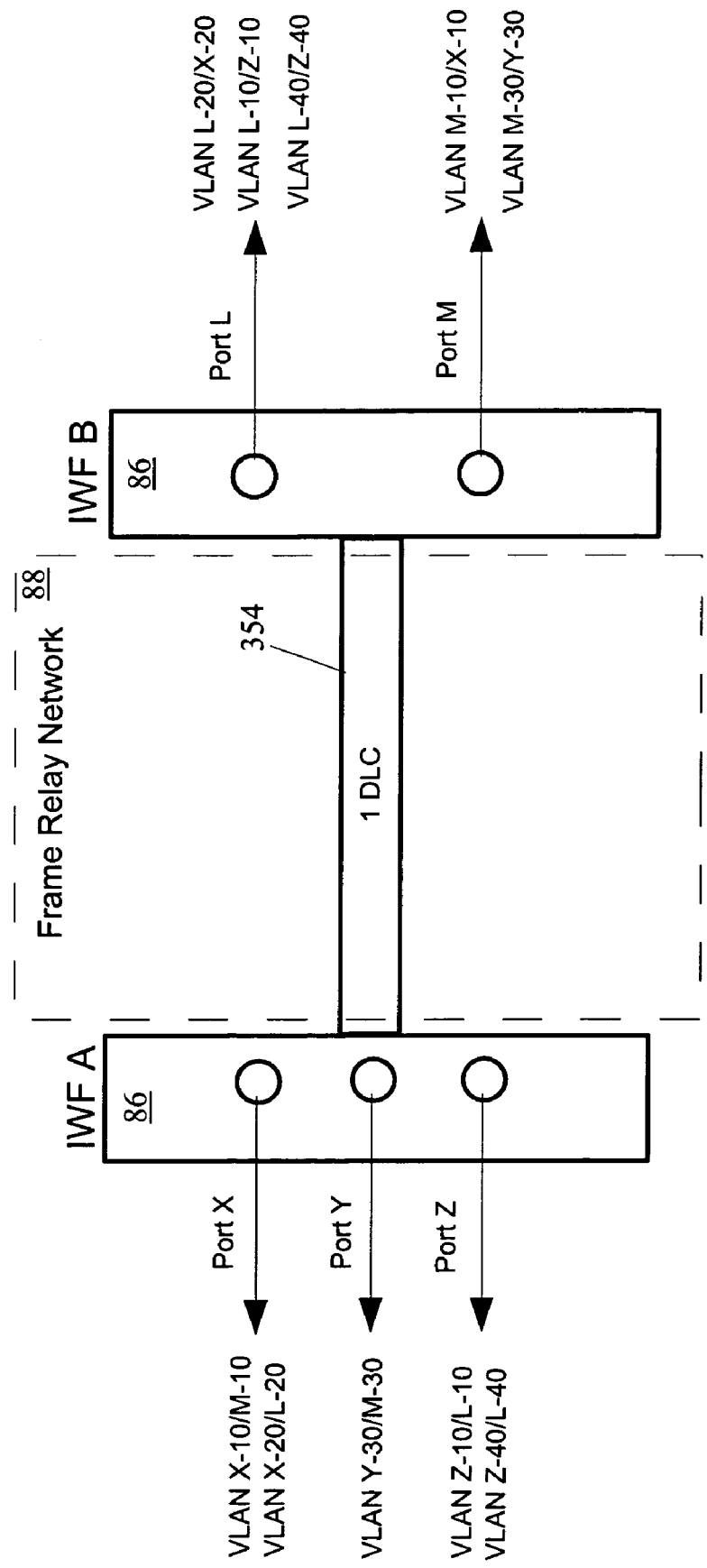
FIG. 29 is a block diagram of virtual local area network aggregation.

Another example of n:1 connection multiplexing, namely VLAN aggregation, is explained with reference to FIG. 29. In this example, "n" Ethernet VLANs on the same or different ports are mapped to a single frame relay DLC. This arrangement advantageously allows VLANs originating on the same Ethernet to be forwarded to different egress interfaces/ports based on the destination MAC address. Recall that the MAC address is preserved in all network interworking scenarios. As is shown in FIG. 29, five EVCs are being transported from ingress IWF 86 to egress IWF 86 across a single DLC 354. Ports X and Z support two EVCs each, while port Y supports a single EVC. The VLAN notation used in FIG. 29 refers to the source VLAN and port and the destination VLAN and port. For example, "VLAN X-10/M-10" refers to a source of VLAN 10 on port X and destination VLAN 10 on port M. These five EVCs are multiplexed together and transported as the single DLC 354. Also, as with the port aggregation of FIG. 28, the use of multiple DLCs for load sharing and the variation in which different ports on the IWFs can be aggregated is applicable to the VLAN aggregation example of FIG. 29.

Figure 30:
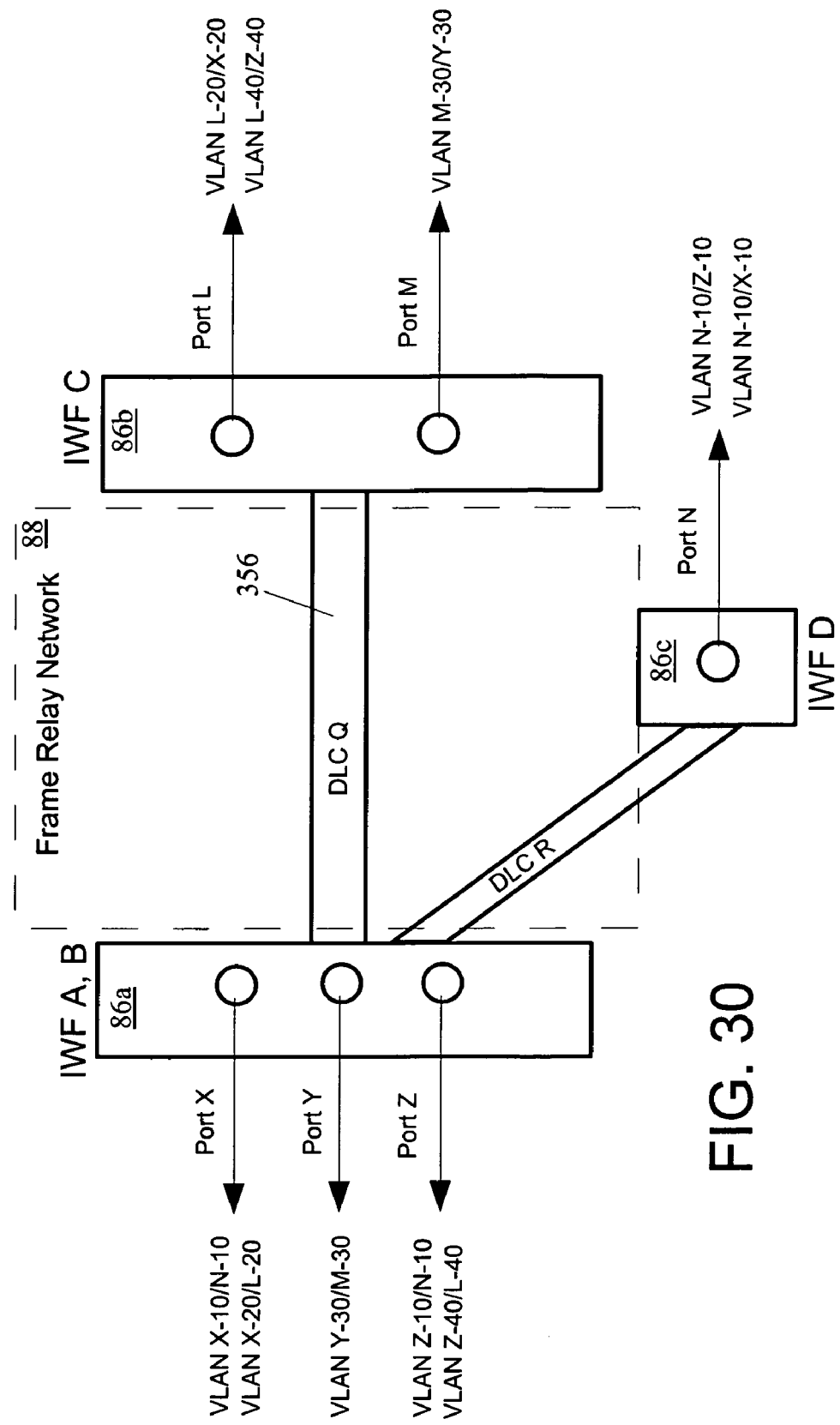
FIG. 30 is a block diagram of partial virtual local area network aggregation.

Another example of n:1 connection multiplexing, namely partial VLAN aggregation, is explained with reference to FIG. 30. In this example, VLANs are partially bundled based on the destination IWF. This arrangement allows the partial aggregation of a subset of VLANs on a frame relay DLC, thereby allowing communication with multiple IWFs 86, for example, from IWF A and B (shown as 86a) to physically separate IWF C (shown as 86b) and IWF D (shown as 86c) via two separate DLCs Q and R, respectively. This arrangement allows for the flexible mapping of VLANs from a single ingress IWF to multiple egress IWFs. For example, port Z sources two VLANS, namely VLAN Z-10 and VLAN Z-40, each of which has a destination port on different IWFs (IWF 86b and IWF 86c). Also, as with the port aggregation of FIG. 28, the use of multiple DLCs for load sharing and the variation in which different ports on the IWFs can be aggregated is applicable to the VLAN aggregation example of FIG. 30.

The present invention advantageously provides a system, method and function for interworking between Ethernet and frame relay networks in a manner which maintains and supports class of service definitions from one network protocol to the other.

The present invention can be realized in hardware, software, or a combination of hardware and software. An implementation of the method and system of the present invention can be realized in a centralized fashion in one computing system, or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. An interworking device for supporting network interworking between an Ethernet communication network and a frame relay network, the interworking device including:
    a first network interface operable to communicate with the Ethernet communication network using an Ethernet communication protocol;
    a second network interface operable to communicate with the frame relay communication network using a frame relay protocol; and
    a processing unit in communication with the first network interface and the second network interface, the processing unit:
        encapsulating frames received from the Ethernet network into frame relay frames;
        decapsulating frames received from the frame relay network to recover Ethernet frames; and
        mapping parameters corresponding to the received one of the frame relay and Ethernet frames into the other of the frame relay and Ethernet frames, the mapped parameters including connection configuration control plane information and data plane parameters corresponding to individual frames.

2. The device according to claim 1, wherein the connection configuration control plane information includes at least one of connection mapping information, class of service class mapping information, and traffic parameters information.

3. The device according to claim 2, wherein connection mapping information includes mapping Ethernet connection data to a frame relay DLCI.

4. The device according to claim 3, wherein Ethernet connection data includes an Ethernet virtual LAN identifier.

5. The device according to claim 2, wherein the processing unit further determines a correction factor to map data rates between the Ethernet frames and the frame relay frames.

6. The device according to claim 2, wherein class of service mapping is used by the processing unit to establish the data plane mapping parameters during frame processing.

7. The device according to claim 6, wherein the Ethernet network supports multiple classes of service, and wherein, for the Ethernet to frame relay direction, a frame relay DLCI is assigned to each Ethernet class of service.

8. The device according to claim 6, wherein the Ethernet network supports multiple classes of service, and wherein, for the Ethernet to frame relay direction, a separate frame relay DLCI is assigned to at least one Ethernet class of service based on one or more of a virtual LAN identifier, a p-bits value and the Ethernet interface upon which the frame was received.

9. The device according to claim 2, wherein the Ethernet network includes at least one Ethernet virtual connection (EVC) and wherein frame processing for multiple Ethernet service classes (CoS) are supported for each EVC, the processing unit using the Ethernet frame service class to select one of a plurality of outgoing frame relay DLCs for encapsulation and mapping.

10. The device according to claim 1, wherein data plane parameters corresponding to individual frames include at least one of congestion information, discard eligibility and a pause frame.

11. The device according to claim 10, wherein the processing unit further generates a pause frame upon receipt of a BECN from the frame relay network, the pause frame causing one of all traffic on a port and on an individual VLAN to be stopped.

12. The device according to claim 10, wherein congestion information mapping includes mapping at least one of a forward explicit congestion notification (FECN) and a backward explicit congestion notification (BECN) bit in the frame relay frame with a p-bit in the Ethernet frame.

13. The device according to claim 10, wherein discard eligibility mapping includes mapping between a discard eligibility (DE) bit in the frame relay frame and a p-bit in the Ethernet frame.

14. The device according to claim 10 wherein the discard eligibility mapping is based on an Ethernet per hop behavior.

15. The device according to claim 10, wherein the processing unit further performs one of dropping frames that exceed a maximum supported Ethernet frame length for frames traveling in the frame relay to Ethernet direction and one of fragmenting and dropping frame relay frames that exceed a maximum supported Ethernet frame length for frames traveling in the frame relay to Ethernet direction.

16. The device according to claim 1, wherein mapping parameters corresponding to the received one of the frame relay and Ethernet frames into the other of the frame relay and Ethernet frames includes:
classifying parameters of a received frame;
mapping and marking the parameters of a received frame into a frame to be transmitted; and
forwarding the frame to one of the first and second network interfaces for transmission.

17. The device according to claim 1, wherein the Ethernet network includes a plurality of Ethernet virtual connections, and wherein the processing unit aggregates at least a portion of the plurality of Ethernet virtual connections into a single data link connection for transmission to the frame relay network.

18. A method for interworking between an Ethernet communication network and a frame relay network, the method comprising:
encapsulating frames received from the Ethernet network into frame relay frames
decapsulating frames received from the frame relay network to recover Ethernet frames; and
mapping parameters corresponding to the received one of the frame relay and Ethernet frames into the other of the frame relay and Ethernet frames, the mapped parameters including connection configuration control plane information and data plane parameters corresponding to individual frames.

19. The method according to claim 18, wherein the connection configuration control plane information includes at least one of connection mapping information, class of service class mapping information and traffic parameters information.

20. The method according to claim 19, wherein connection mapping information includes mapping Ethernet connection data to a frame relay DLCI.

21. The method according to claim 20, wherein Ethernet connection data includes an Ethernet virtual LAN identifier.

22. The method according to claim 19, further comprising determining a correction factor to map data rates between the Ethernet frames and the frame relay frames.

23. The method according to claim 19, further comprising using the class of service mapping to establish the data plane mapping parameters during frame processing.

24. The method according to claim 23, wherein the Ethernet network supports multiple classes of service, and wherein the method further comprises, for the Ethernet to frame relay direction, assigning a frame relay DLCI to each Ethernet class of service.

25. The method according to claim 23, wherein the Ethernet network supports multiple classes of service, and wherein the method further comprises, for the Ethernet to frame relay direction, assigning a separate frame relay DLCI to at least one Ethernet class of service based on one or more of a virtual LAN identifier, a p-bits value and the Ethernet interface upon which the frame was received.

26. The method according to claim 19, wherein the Ethernet network includes at least one Ethernet virtual connection (EVC) and wherein frame processing for multiple Ethernet service classes (CoS) are supported for each EVC, the method further comprising using the Ethernet frame service class to select one of a plurality of outgoing frame relay DLCs for encapsulation and mapping.

27. The method according to claim 18, wherein data plane parameters corresponding to individual frames include at least one of congestion information, discard eligibility and a pause frame.

28. The method according to claim 27, further including:
generating a pause frame upon receipt of a BECN, and stopping one of all traffic on a port and on an individual VLAN.

29. The method according to claim 27, wherein congestion information mapping includes mapping at least one of a forward explicit congestion notification (FECN) and a backward explicit congestion notification (BECN) bit in the frame relay frame with a p-bit in the Ethernet frame.

30. The method according to claim 27, wherein discard eligibility mapping includes mapping between a discard eligibility (DE) bit in the frame relay frame and a p-bit in the Ethernet frame.

31. The method according to claim 27 wherein the discard eligibility mapping is based on an Ethernet per hop behavior.

32. The method according to claim 27, wherein the method further comprises one of dropping frames that exceed a maximum supported Ethernet frame length for frames traveling in the frame relay to Ethernet direction and one of fragmenting and dropping frame relay frames that exceed a maximum supported Ethernet frame length for frames traveling in the frame relay to Ethernet direction.

33. The method according to claim 18, wherein mapping parameters corresponding to the received one of the frame relay and Ethernet frames into the other of the frame relay and Ethernet frames includes:
classifying parameters of a received frame;
mapping and marking the parameters of a received frame into a frame to be transmitted; and
forwarding the frame to one of the first and second network interfaces for transmission.

34. The method according to claim 18, further comprising performing interworking with a third communication network employing a networking technology other than Ethernet and frame relay, the third communication network being coupled between the Ethernet communication network and the frame relay communication network, wherein the interworking is performed on the Ethernet side of the third communication network.

35. The method according to claim 18, wherein the Ethernet network includes a plurality of Ethernet virtual connections, and wherein the method further comprises aggregating at least a portion of the plurality of Ethernet virtual connections into a single data link connection for transmission to the frame relay network.

36. A storage medium storing a computer program which when executed by a processing unit performs a method for network interworking between an Ethernet communication network and a frame relay network, the method comprising:
encapsulating frames received from the Ethernet network into frame relay frames
decapsulating frames received from the frame relay network to recover Ethernet frames; and
mapping parameters corresponding to the received one of the frame relay and Ethernet frames into the other of the frame relay and Ethernet frames, the mapped parameters including connection configuration control plane information and data plane parameters corresponding to individual frames.

* * * * *